United States Patent
Hanson et al.

(10) Patent No.: US 11,780,484 B2
(45) Date of Patent: Oct. 10, 2023

(54) UTILITY CART AND TRANSPORT SYSTEM

(71) Applicant: Compass Carts LLC, Rochester, MN (US)

(72) Inventors: Todd Hanson, Rochester, MN (US); Steve Shae, West Concord, MN (US); Matt Mundahl, Buffalo, MN (US)

(73) Assignee: Compass Carts LLC, Rochester, MN (US)

( * ) Notice: Subject to any disclaimer, the term of this patent is extended or adjusted under 35 U.S.C. 154(b) by 0 days.

(21) Appl. No.: 17/984,842

(22) Filed: Nov. 10, 2022

(65) Prior Publication Data
US 2023/0159120 A1    May 25, 2023

Related U.S. Application Data

(60) Provisional application No. 63/350,566, filed on Jun. 9, 2022, provisional application No. 63/350,403, filed
(Continued)

(51) Int. Cl.
*B62B 3/02* (2006.01)
*B62D 63/08* (2006.01)
(Continued)

(52) U.S. Cl.
CPC ............. *B62B 3/02* (2013.01); *B62B 5/0003* (2013.01); *B62D 63/062* (2013.01); *B62D 63/08* (2013.01)

(58) Field of Classification Search
CPC .. B62D 63/061; B62D 63/062; B62D 63/068; B62D 63/08; B62B 3/02; B62B 3/025; B62B 3/027; B62B 5/0003
See application file for complete search history.

(56) References Cited

U.S. PATENT DOCUMENTS

| | | | |
|---|---|---|---|
| 4,275,896 A | 6/1981 | Eicher | |
| 4,392,687 A * | 7/1983 | O'Connell | B62D 63/061 280/30 |

(Continued)

FOREIGN PATENT DOCUMENTS

| | | |
|---|---|---|
| CA | 2956005 C | 1/2018 |
| EP | 3476445 A1 * | 5/2019 |

OTHER PUBLICATIONS

Aosom Bicycle Cargo Trailer, Two-Wheel Bike Luggage Wagon with Removable Cover, Yellow, retrieved on Oct. 31, 2022, pp. 1, available at: aosom.com/item/aosom-elite-folding-bike-cargo-and-luggage-trailer-with-removable-cover-and-quick-release-wheels-yellow-5664-000SY.html.

(Continued)

*Primary Examiner* — Tony H Winner
*Assistant Examiner* — Maurice L Williams
(74) *Attorney, Agent, or Firm* — Headland Law & Strategy; Matthew J. Smyth

(57) ABSTRACT

In some implementations, a utility cart includes (a) a cargo hold having a cargo bed; (b) an assembly having a wheel arm having a first catch, a handle arm having a second catch, and a wheel; the wheel arm and handle arm coupled together at an angle and adjacent a pivot point; the wheel rotatably coupled to a distal end of the wheel arm; (c) a locking mechanism and a spring member, the locking mechanism having a first locking pin and a second locking pin; and (d) a plurality of bearing wheels disposed below a bottom surface of the cargo bed.

20 Claims, 23 Drawing Sheets

Related U.S. Application Data on Jun. 8, 2022, provisional application No. 63/283,212, filed on Nov. 25, 2021.

(51) Int. Cl.
*B62D 63/06* (2006.01)
*B62B 5/00* (2006.01)

(56) References Cited

U.S. PATENT DOCUMENTS

| | | | |
|---|---|---|---|
| 4,789,171 | A | 12/1988 | Porter |
| 4,921,305 | A * | 5/1990 | Steer .................. B62B 1/22 |
| | | | 298/3 |
| 5,372,376 | A * | 12/1994 | Pharaoh ............... B62B 1/206 |
| | | | 298/3 |
| 5,421,597 | A | 6/1995 | Berner |
| 5,489,109 | A | 2/1996 | Murphy |
| 5,649,718 | A | 7/1997 | Groglio |
| 5,788,135 | A * | 8/1998 | Janek ................... B60R 9/065 |
| | | | 224/527 |
| 5,826,768 | A | 10/1998 | Gamulo |
| 5,833,074 | A | 11/1998 | Phillips |
| 6,045,150 | A | 4/2000 | Al-Toukhi |
| 6,070,899 | A | 6/2000 | Gines |
| 6,318,808 | B1 | 11/2001 | Shayne |
| 6,620,081 | B2 | 9/2003 | Phillips |
| 6,783,315 | B1 * | 8/2004 | Senechal ............... B60P 1/43 |
| | | | 224/524 |
| 6,935,656 | B2 | 8/2005 | Stout |
| 6,991,250 | B2 | 1/2006 | Lindsey et al. |
| 7,543,842 | B1 | 6/2009 | Fiorini |
| 7,891,697 | B1 | 2/2011 | Fahrbach |
| 8,327,979 | B2 | 12/2012 | Lynch et al. |
| 8,342,544 | B1 * | 1/2013 | Blewett ................ B62B 3/022 |
| | | | 211/195 |
| 8,348,301 | B2 | 1/2013 | Darling |
| 8,448,978 | B2 * | 5/2013 | Alvarino ............. B62D 63/067 |
| | | | 280/638 |
| 8,505,932 | B1 * | 8/2013 | Piccirillo ............. B62K 27/02 |
| | | | 280/30 |
| 8,696,012 | B2 | 4/2014 | Oyasaeter |
| 8,820,774 | B2 | 9/2014 | Schonhardt |
| 9,056,623 | B1 | 6/2015 | Woller et al. |
| 9,126,610 | B1 * | 9/2015 | Abiri ................... B62B 3/027 |
| 9,440,668 | B1 * | 9/2016 | Chen ................... B62B 5/0013 |
| 9,533,623 | B2 | 1/2017 | Descoteaux |
| 9,623,924 | B2 | 4/2017 | Huskey |
| 9,688,298 | B1 * | 6/2017 | Su ......................... B62B 1/12 |
| 9,694,758 | B1 | 7/2017 | Krolski et al. |
| 9,731,642 | B2 * | 8/2017 | Narinen ................ B60P 3/122 |
| 9,902,222 | B1 | 2/2018 | Phillips |
| 9,956,922 | B2 | 5/2018 | Phillips |
| 10,005,329 | B2 | 6/2018 | Phillips |
| 10,011,237 | B1 | 7/2018 | Phillips |
| 10,059,276 | B2 | 8/2018 | Phillips |
| 10,065,568 | B2 | 9/2018 | Phillips |
| 10,071,695 | B2 | 9/2018 | Phillips |
| 10,086,769 | B1 | 10/2018 | Phillips |
| 10,099,525 | B1 | 10/2018 | Phillips |
| 10,106,100 | B1 | 10/2018 | Phillips |
| 10,112,634 | B1 * | 10/2018 | Davydov .............. B62B 5/0003 |
| 10,124,740 | B2 | 11/2018 | Phillips |
| 10,150,424 | B1 | 12/2018 | Phillips |
| 10,160,467 | B2 * | 12/2018 | Josephsen ............ B62B 1/12 |
| 10,167,887 | B1 * | 1/2019 | Phillips ................ B60D 1/02 |
| 11,014,591 | B2 | 5/2021 | Parrish |
| 11,305,801 | B2 * | 4/2022 | Killy .................... B62B 3/1484 |
| 2003/0038457 | A1 * | 2/2003 | Eskridge ............. B62B 3/04 |
| | | | 280/648 |
| 2004/0051290 | A1 * | 3/2004 | Morgan ............... B60R 9/06 |
| | | | 280/769 |
| 2006/0192356 | A1 * | 8/2006 | Coates ................ B62D 63/062 |
| | | | 280/43.17 |
| 2007/0001431 | A1 | 1/2007 | Fiorini |
| 2008/0206031 | A1 * | 8/2008 | Butta .................. B60R 9/06 |
| | | | 254/323 |
| 2009/0115163 | A1 | 5/2009 | Winter et al. |
| 2010/0066069 | A1 | 3/2010 | Bradshaw |
| 2010/0207359 | A1 | 8/2010 | Staniszewski |
| 2011/0169235 | A1 * | 7/2011 | Moster ................ B62B 3/027 |
| | | | 280/30 |
| 2013/0234420 | A1 * | 9/2013 | Reimers .............. A63B 55/60 |
| | | | 280/651 |
| 2014/0265248 | A1 * | 9/2014 | Ravencroft .......... B62D 63/061 |
| | | | 280/491.1 |
| 2016/0286955 | A1 * | 10/2016 | Cohen .................. A47B 31/04 |
| 2020/0062162 | A1 | 2/2020 | Owens |
| 2020/0247446 | A1 * | 8/2020 | Stroh .................... B62B 5/0003 |
| 2022/0032984 | A1 * | 2/2022 | O'Donnell ........... B62B 5/0003 |

OTHER PUBLICATIONS

Dock Edge + Smart Cart/Fold a Cart and Dock Side, retrieved on Oct. 31, 2022, pp. 7, available at: https://www.amazon.com/Dock-Edge-Smart-Cart-Fold/dp/B00AJVWABM/.

Gorilla Carts, 7 Cubic Feet Foldable Collapsible Durable All Terrain Utility Pull Beach Wagon with Oversized Bed and Built in Cup Holders, Black, retrieved on Oct. 31, 2022, pp. 9, available at: https://www.amazon.com/Gorilla-Carts-GCSW-7P-Collapsible-Oversized/dp/B081285C4C.

Hanson, Todd, Images Excerpted from "The Exo Life V2," YouTube, posted to YouTube Feb. 6, 2019, (no longer available).

Hanson, Todd, Images Excerpted from www.theexolife.com, posted to the website Sep. 26, 2019 (no longer available).

Haul-Master, 500 lb. Steel Cargo Carrier, retrieved on Oct. 31, 2022, pp. 7, available at: https://www.harborfreight.com/500-b-capacity-deluxe-cargo-carrier-66983.html.

Taylor Made Products, Dock Pro Dock Cart, retrieved on Oct. 31, 2022, pp. 7, available at: https://www.amazon.com/TAYLOR-MADE-PRODUCTS-Dock-Cart/dp/B002MWQDI2/.

Tipke Manufacturing, Tipke 2100 Marine Fold-It Utility Cart, retrieved on Oct. 31, 2022, pp. 8, available at: https://www.amazon.com/Tipke-2100-Marine-Fold-Utility/dp/B00006LPPJ.

Viking Solutions, Tilt-N-Go II Hunting Cart and Cargo Carrier—2" Hitch Mount—Steel—300 lbs, retrieved on Oct. 31, 2022, pp. 12, available at: https://www.etrailer.com/Hunting-and-Fishing/Viking-Solutions/310-VTG002.html?feed=npn&utm_source=google&utm_medium=cpc&utm_campaign . . . .

Tripsavvy, WheelEEZ Folding Beach Cart, retrieved Oct. 31, 2022, pp. 12, available at: https://www.tripsavvy.com/wheeleez-folding-beach-cart-review-4770790.

Yeti, The Hitchcarrier™, retrieved on Oct. 31, 2022, pp. 4, available at: https://denylocks.com/product/hitch-carrier-platform/.

* cited by examiner ical field

UTILITY CART AND TRANSPORT SYSTEM

CROSS-REFERENCE TO RELATED APPLICATIONS

This application claims the benefit of U.S. Provisional Application Ser. No. 63/283,212, titled "UTILITY CART AND TRANSPORT SYSTEM," filed on Nov. 25, 2021; U.S. Provisional Application Ser. No. 63/350,403 titled "UTILITY CART AND TRANSPORT SYSTEM," filed on Jun. 8, 2022; and U.S. Provisional Application Ser. No. 63/350,566, titled "UTILITY CART AND TRANSPORT SYSTEM," filed on Jun. 9, 2022.

This application incorporates the entire contents of the foregoing application(s) herein by reference.

TECHNICAL FIELD

Various implementations relate generally to a utility cart for hauling various types of cargo, and a system for transporting the same.

BACKGROUND

Utility carts are employed in various applications, such as, for example, hauling equipment, gear, or other items from one location to another. For example, a hunter may employ a utility cart to haul equipment from a vehicle to a remote hunting location, then use the same utility cart to return the equipment to the vehicle and retrieve game from the remote hunting location. The utility cart may be required to traverse rugged terrain and support heavy and bulky game. As another example, a construction crew may employ a utility cart to haul tools, equipment, and materials from a vehicle to a remote job site, then later use the same utility cart to return the tools and equipment to the vehicle. As another example, an outdoor enthusiast may employ a utility cart to haul a bicycle and/or camping equipment from a vehicle to a remote recreational site. In some implementations, it may be advantageous for the utility cart to be stowable inside or outside a vehicle.

SUMMARY

Described herein are implementations of a utility cart that can be employed to haul various equipment from one location to another. Also described are systems for coupling the utility cart to a vehicle for transport.

In some implementations, a utility cart includes (a) a cargo hold having a cargo bed; (b) an assembly having a wheel arm having a first catch, a handle arm having a second catch, and a wheel; the wheel arm and handle arm coupled together at an angle and adjacent a pivot point; the wheel rotatably coupled to a distal end of the wheel arm; and (c) a locking mechanism and a spring member that biases the locking mechanism in a direction that is parallel to a length of the cargo hold, the locking mechanism having a first locking pin and a second locking pin that are coupled to a structural member of the locking mechanism in a manner that fixes a position of the first locking pin relative to a position of the second locking pin.

The assembly may be pivotably coupled to the cargo hold, and the locking mechanism and assembly may be configured such that in a first orientation, the wheel arm is disposed parallel to a length of the cargo bed, the wheel is disposed below the cargo bed to facilitate travel of the utility cart, and the first locking pin engages the first catch. The assembly may be further configured such that in a second orientation, the handle arm is disposed parallel to the length of the cargo bed, the wheel is disposed to facilitate stowage of the utility cart, and the second locking pin engages the second catch.

The locking mechanism may include a locking plate that is slidably coupled to the cargo hold. The cargo hold may further include a plurality of bearing wheels disposed below a bottom surface and positioned to facilitate rolling of the utility cart in the second orientation. The plurality of bearing wheels may be aligned to engage one or more tracks on a corresponding vehicle hitch-mounted rack.

In some implementations, a utility cart includes (a) a cargo hold having a cargo bed; (b) an assembly having a wheel arm having a first catch, a handle arm having a second catch, and a wheel; the wheel arm and handle arm being coupled together at an angle and adjacent a pivot point; the wheel being rotatably coupled to a distal end of the wheel arm; (c) a locking mechanism and a spring member, the locking mechanism having a first locking pin and a second locking pin that are coupled to a structural member of the locking mechanism in a manner that fixes a position of the first locking pin relative to a position of the second locking pin; and (d) a plurality of bearing wheels disposed below a bottom surface of the cargo bed.

The assembly may be pivotably coupled to the cargo hold. The locking mechanism and assembly may be configured such that in a first orientation, the wheel arm is disposed parallel to a length of the cargo bed, the wheel is disposed below the cargo bed to facilitate travel of the utility cart, and the first locking pin engages the first catch. The locking mechanism and assembly may be further configured such that in a second orientation, the handle arm is disposed parallel to the length of the cargo bed, the wheel is disposed to facilitate stowage of the utility cart, and the second locking pin engages the second catch. The plurality of bearing wheels may be positioned to facilitate rolling of the utility cart in the second orientation. The spring member may bias the locking mechanism such that, absent an opposing force, engagement can be maintained between either the first locking pin and the first catch, or between the second locking pin and the second catch.

The cargo hold may include a removable rear wall. The assembly may include a telescoping portion that can be rotated about a pivot point to facilitate transport by users of various heights. The cargo hold may include a plurality of stake pockets configured to retain objects or accessories vertically. One of the stake pockets may be reinforced to a greater extent than the others and be configured to accept a tow accessory to couple the utility cart to a bicycle or other tow vehicle. The utility cart may further include one or more kickstands.

In some implementations, a system includes (a) a utility cart having (i) a cargo hold having a cargo bed; (ii) an assembly having a pair of wheel arms each having a first catch, a pair of handle arms each having a second catch, and wheels disposed on each wheel arm; each wheel arm and handle arm coupled together at an angle and adjacent a pivot point; each wheel rotatably coupled to a distal end of its respective wheel arm; (iii) a locking mechanism and a spring member, the locking mechanism having a pair of first locking pins and a pair of second locking pins; and (iv) a plurality of bearing wheels disposed below a bottom surface of the cargo bed; and (b) a rack configured to be coupled to a vehicle hitch, the rack having (A) tracks that are configured to accommodate pairs of wheels in the plurality of bearing wheels; and (B) a rack pivot that enables the tracks to be rotated towards the ground when the rack is coupled to a vehicle.

The assembly may be pivotably coupled to the cargo hold. The locking mechanism and assembly may be configured such that in a first orientation, the wheel arms are disposed parallel to a length of the cargo bed, the wheels are disposed below the cargo bed to facilitate travel of the utility cart, and the first locking pins engage the first catches. The locking mechanism and assembly may be further configured such that in a second orientation, the handle arms are disposed parallel to the length of the cargo bed, the wheels are disposed above a bottom of the cargo bed to facilitate stowage of the utility cart, and the second locking pins engage the second catches. The spring member may bias the locking mechanism such that, absent an opposing force, engagement can be maintained between either the first locking pin and the first catch, or between the second locking pin and the second catch.

The rack may further include a hitch-coupling member having one of a straight configuration, an "L'" configuration, or an adjustable-height configuration. The system may further include an adjustable track-pivot stop that adjustably limits rotation of the tracks. The adjustable track-pivot stop may include a plurality of threaded apertures and a corresponding threaded knob. The adjustable track-pivot stop may further include a brake or dampening mechanism that limits a speed at which the tracks can rotate.

The system may further include apertures on a structural member coupled to the tracks and apertures on the rack that cooperate to receive a locking pin to prevent the tracks from rotating. The system may further include apertures on the rack and apertures on the utility cart that cooperate to receive a locking pin that couples the utility cart to the rack. The rack may further include a mounting plate and a winch mounted on the mounting plate.

The bearing wheels may include a plurality of pairs of bearing wheels, wherein at least one pair of the plurality is disposed in a channel, in one of a plurality of mounting positions along a length of the cargo hold. The bearing wheels may extend below a bottom of the cargo bed and below the channel, such that they are aligned to engage the tracks when the cart is disposed on or being loaded onto the rack.

DETAILED DESCRIPTION

Described herein are implementations of a utility cart that can be employed to haul various equipment from one location to another. Also described are systems for loading the cart onto a vehicle-mounted rack for transport and details of exemplary vehicle-mounted racks.

Figure 1A:
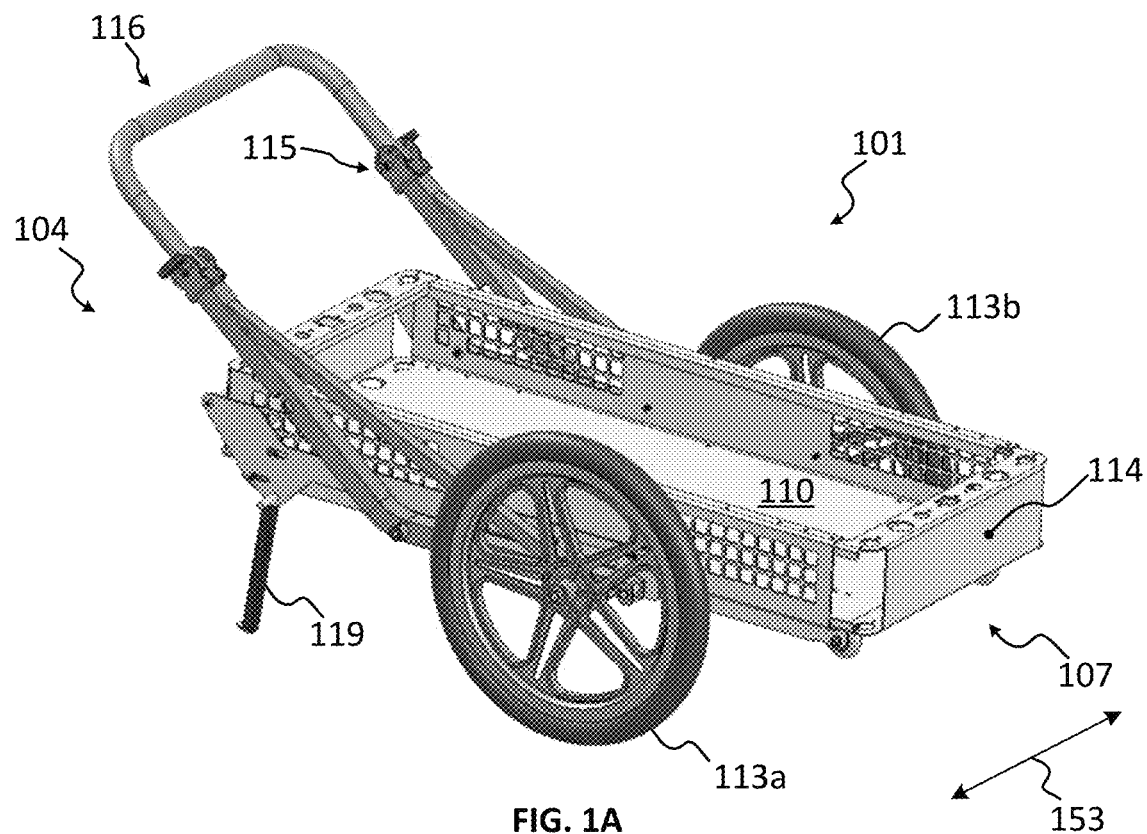
FIG. 1A is a perspective view of an exemplary utility cart, shown in a transport configuration.

FIG. 1A is a perspective view of an exemplary utility cart 101, shown in a transport configuration 104—where it is configured to transport or haul objects of various types. As shown, the utility cart 101 includes a cargo hold 107 and cargo bed 110, a pair of transport wheels 113*a* and 113*b*, and a handle 116. The utility cart 101 may also include a kickstand 119 (or more than one kickstand, such as one kickstand on each side) for stability in the transport configuration 104.

Figure 1B:
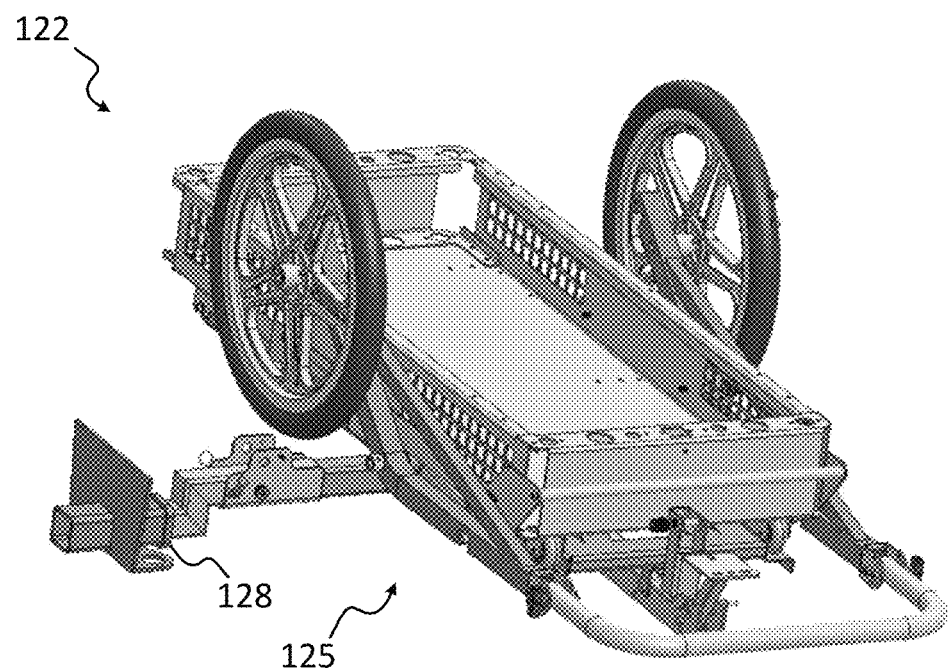
FIG. 1B is a perspective view of the exemplary utility cart of FIG. 1A, shown in a stow configuration on a vehicle hitch-mounted rack.

FIG. 1B is a perspective view of the exemplary utility cart 101, shown in a stow configuration 122—where it is folded and stowed on a rack 125, which may be configured to be mounted to a vehicle hitch 128.

In some implementations, the utility cart 101 may be constructed with various square, tubular, flat, and folded sheet-based structural components—made from, for example, steel, aluminum, hard plastic, polymer etc. The components may be coated, painted or otherwise treated to resist corrosion. On sheet components, portions may be removed (e.g., by laser cutting or stamping) as shown in FIG. 1A, for example, to minimize weight of the cart 101. Components may be coupled to each other in various ways. For example, some components may be welded together; other components may be bolted, screwed, or riveted together; certain components may be adhesively jointed together; other components may be temporarily secured to each other with compression fittings, clips, clasps, snaps, spring-catches, etc.; other components may be rotatably coupled to each other using pivots, axles, bolts, rivets, etc.

In some implementations, wheels 113a and 113b may be run-flat tires comprising rubber or plastic that facilitates travel over rough terrain and wears well over a variety of surfaces. In other implementations, the wheels 113a and 113b may be inflatable and either have an inner tube or be sealed to a rim and be inflated directly. The wheels may be reinforced, for example, with a inner mesh or tread. An outer surface may be textured to promote grip. In some implementations, the wheels 113a and 113b may include wide tires with substantial elasticity and give (e.g., like the tires of a fat-tire bicycle, which may facilitate travel over soft surfaces such as mud). In some implementations, the wheels 113a and 113b are standard, commercially available bicycle tires or utility cart tires.

Dimensions of the cart 101 may be optimized to facilitate transport and conveyance of heavy loads (e.g., toolboxes, camping equipment, game, hunting equipment, temporary retail or marketing displays or equipment, grills, picnic gear, etc.), while simplifying handling and maximizing flexibility in various settings. For example, an overall width 153 of the cart 101 may be configured to facilitate passage through standard door or gate openings (e.g., 30" to 36" in some implementations).

In some implementations, a rear wall 114 may be removable, to facilitate loading of additional accessories onto the cargo bed 110. For example, an implementation optimized for commercial use (e.g., by a contractor or tradesperson) may have a removable rear wall 114 that permits a tool box accessory to be loaded onto the cart 101. Such an accessory could provide waterproof storage for tools and, in some implementations, a portable power source. As another example, an implementation optimized for recreational outdoor use may have a removable rear wall 114 that facilitates loading of a grill, outdoor kitchen, tents, other bulky items, etc.

The handle 116 may have a telescoping portion that can be adjusted to a specific user's height, or for a specific application. In some implementations, as shown, each side of the handle 116 may have a rotational adjustment 115 to further adjust the handle 116 to a specific user. Additional accessories may be provided to enable a user to easily pull or tow the cart 101. For example, a bicycle attachment is illustrated in and described with reference to FIG. 6. As another example, a belt and strap may be provided that can couple the handle 116 or another portion of the cart 101 to a user. Other towing accessories may be provided to couple the cart to another vehicle.

Figure 1C:
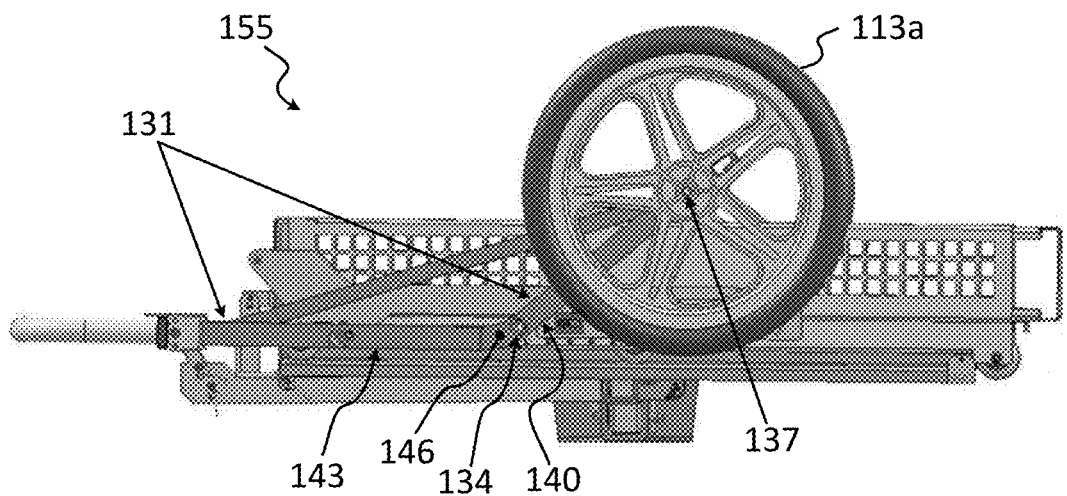
FIG. 1C is a side view of the exemplary utility cart of FIG. 1A, shown in the stow configuration on a vehicle hitch-mounted rack.

Turning to FIG. 1C, each wheel 113a and 112b in the pair of transport wheels may be rotatably mounted on an assembly 131 that pivots about a pivot point 134 to enable the utility cart 101 to be transitioned between the transport configuration 104 and the stow configuration 122. More specifically, each wheel (e.g., 113a) may be rotatably mounted on an axle 137 (see also FIG. 1E, in which the wheel 113a has been removed) that is disposed on a distal end (an end away from the pivot point 134) of a wheel arm 140.

The wheel arm 140 may be coupled to a handle arm 143 at angled connection point 146, which angled connection point 146 may be adjacent the pivot point 134. With such a structure, the assembly 131 may be pivoted between a first orientation 149 (see FIG. 1D), in which the wheel arm 140 is disposed parallel to a length 152 of the cargo hold 107; and a second orientation 155 (see FIG. 1C), in which the handle arm 143 is disposed parallel to the length 152 of the cargo hold 107.

Figure 1D:
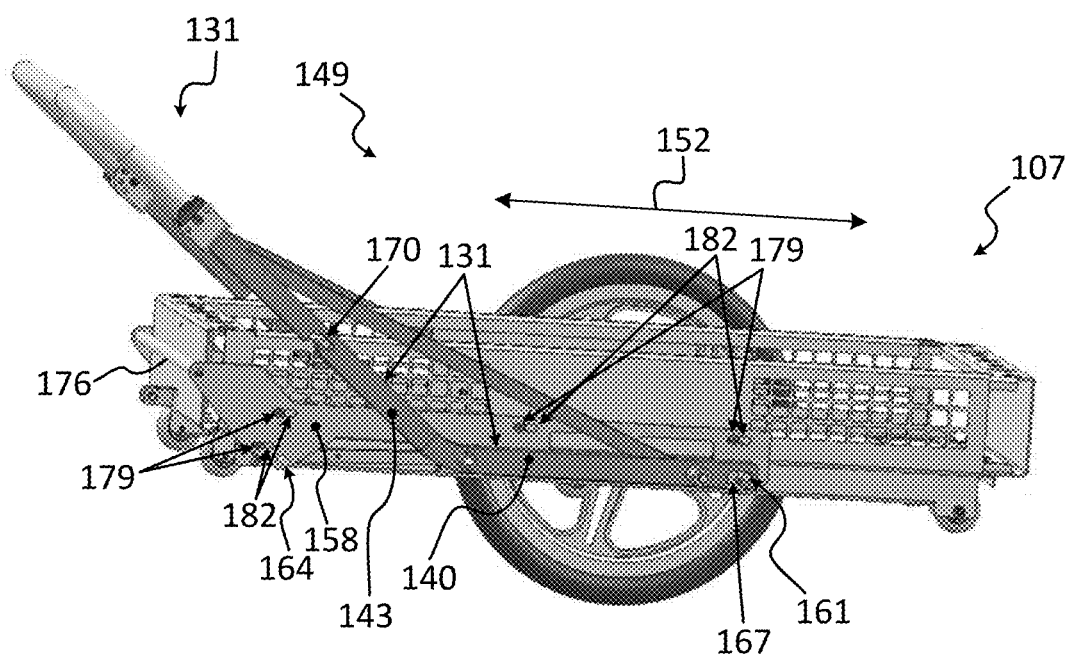
FIG. 1D is a perspective side view of the exemplary utility cart of FIG. 1A, shown with one wheel removed to show various details.

Turning to FIG. 1D, to lock the assembly 131 in either the transport configuration 104 or the stow configuration 122, some implementations include a locking plate 158 that is slidably coupled to the cargo hold 107 and that includes a first locking pin 161 and second locking pin 164. The wheel arm 140 may include a first catch 167 that is configured to engage the first locking pin 161 when the assembly 131 is in the transport configuration 104; and the handle arm 143 may include a second catch 170 that is configured to engage the second locking pin 164 when the assembly 131 is in the stow configuration 122.

The first and second catches 167 and 170 are shown as cutouts in respective arms 140 and 143; but these catches could take other forms. For example, rather than being cut out of a respective arm, each catch may be separately formed and disposed above or below the respective arm, to provide more strength in the respective arm. The arms may be reinforced (e.g., with structural plate material) adjacent the catches. Catches other than notches and pins may be employed (e.g., removable pins, cotter pins, bolts, threaded knobs, etc.).

Figure 1E:
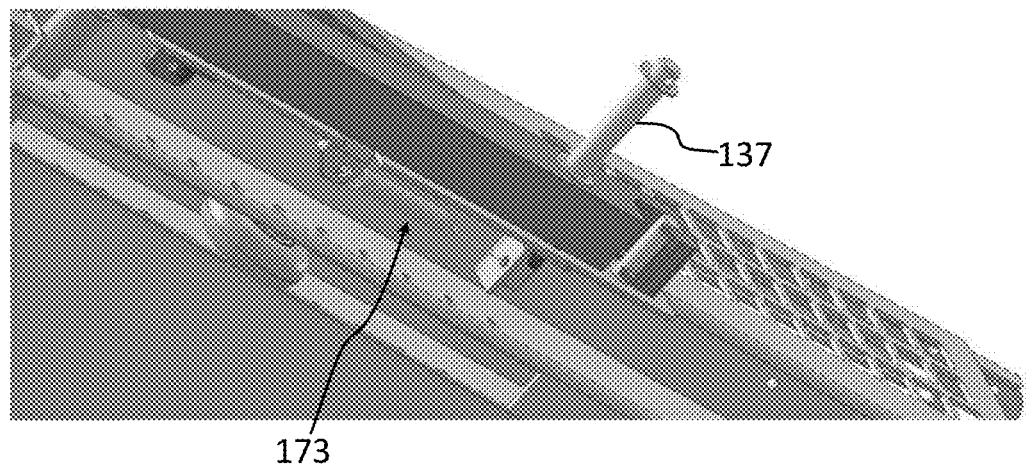
FIG. 1E is a perspective bottom view of the exemplary utility cart of FIG. 1A, showing a spring member that can bias a locking plate, in one implementation.

As shown in FIG. 1E, spring member 173 may bias the locking plate 158 in a direction that is parallel to the length 152 of the cargo hold 107, to maintain engagement between the first locking pin 161 and first catch 167 (in the first orientation 149), or between the second locking pin 164 and second catch 170 (in the second orientation 155). In other implementations, the spring member 173 may bias the locking plate 158 in another manner. For example, a torsion spring or bar may be used in combination with a cam or rotating latch to maintain the locking plate 158 or other locking mechanism in a particular position or orientation. As another example, a removable pin may be used to maintain the locking plate 158 in a particular orientation. Such a removable pin may be spring loaded to bias the pin toward engagement/locking. Tension springs or compression springs may be employed, or other elastic members.

In some implementations, as shown in FIG. 1D, the locking plate 158 includes a handle 176 that is configured to be grasped by a user to overcome the bias provided by the spring member 173 and thereby facilitate decoupling of the first locking pin 161 and first catch 167, or the second locking pin 164 and second catch 170. In some implementations, the locking plate 158 is secured to the cargo hold 107 by shoulder bolts 179 that permit the locking plate 158 to translate (e.g., slide) parallel to the length 152 of the cargo hold 107, in slots 182 that accommodate the shoulder bolts 179.

Figure 1F:
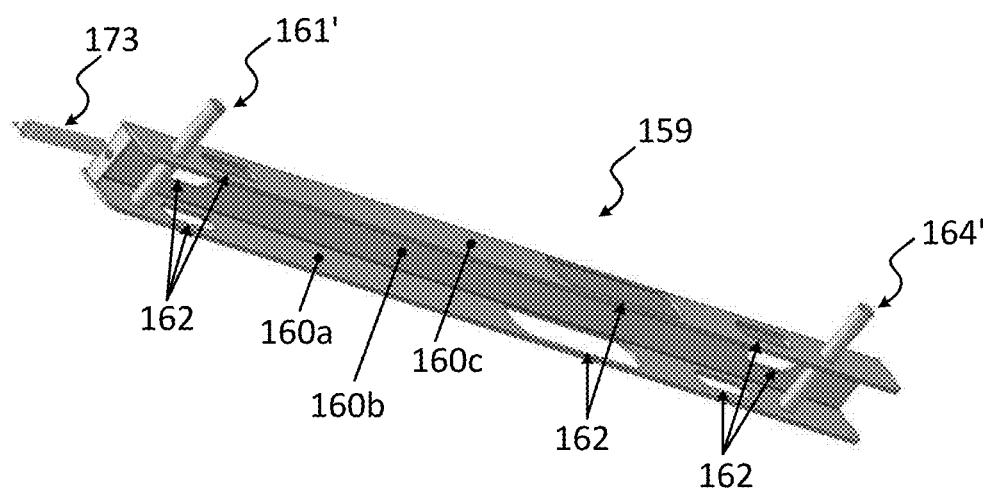
FIG. 1F is a perspective view of an alternative locking mechanism.

In the preceding description, the locking plate 158 is described as a plate that translates along each side of the cargo hold 107. In some implementations, however, the locking mechanism can take other forms. For example, as shown in FIG. 1F, an alternative locking mechanism 159 may be constructed as a partial tube having three sides 160*a*, 160*b* and 160*c*. First and second locking pins 161' and 164' may be disposed through and affixed to two sidewalls, 160*a* and 160*c*, instead of just a single locking plate 158 surface—which construction may provide additional strength to secure the wheel arm 140 or handle arm 143 of the cart 101 (see FIG. 1D). Various notches 162 in the locking mechanism 159 may be employed to engage shoulder bolts or other fasteners that slidably couple the locking mechanism 159 to the cart 101. Openings 162 may be further provided to accommodate the pivot 134 and, if present, pivot axle 135 (see FIGS. 1C and 3). As with an exemplary locking plate 158, a spring member 173 may bias the locking member 159 in a direction parallel to a length 152 of the cargo hold.

Figure 3:
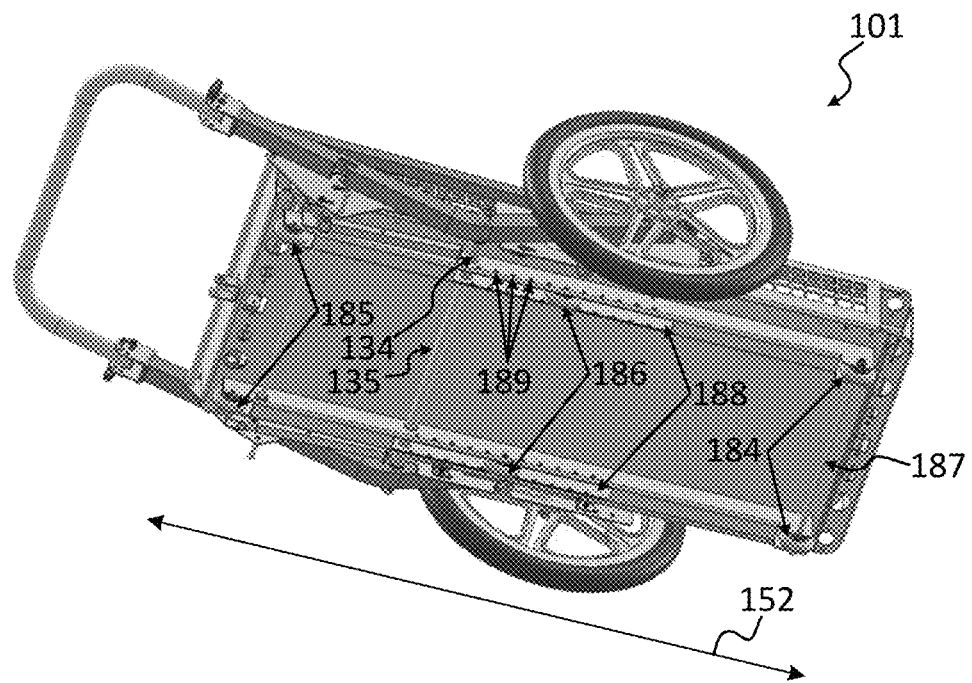
FIG. 3 is a bottom perspective view showing exemplary bearing wheels.

In some implementations that include locking mechanisms like the locking mechanism 159, a locking mechanism 159 may be disposed on each side of the cart 101, under the cargo bed 110 and adjacent the channels 188 that support bearing wheels 184, 185 and 186 (see FIG. 3). Other variations are possible. For example, a spring-loaded or ratcheted knob having a rod or pin may be employed to selectively engage or disengage a corresponding aperture to fix or release different components together to facilitate the locking of specific components into one configuration or another.

Figure 2A:
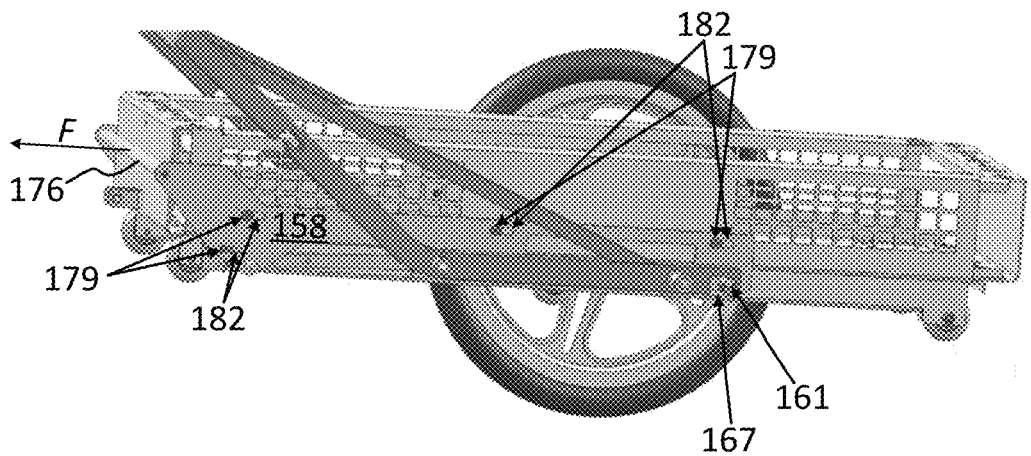
FIGS. 2A-2C are side perspective views depicting operation of a locking plate, in one implementation.

Operation of the exemplary locking plate 158 is now further described with reference to FIGS. 2A-2C. Turning to FIG. 2A, a force, F, applied on the handle 176 in the direction shown and at a magnitude that overcomes the force of the spring member 173 (see FIG. 1E), will cause the locking plate 158 to translate in the direction of the applied force F. That is, the locking plate 158 will slide to the extent that the slots 182 accommodate the corresponding shoulder bolts 179.

Figure 2B:
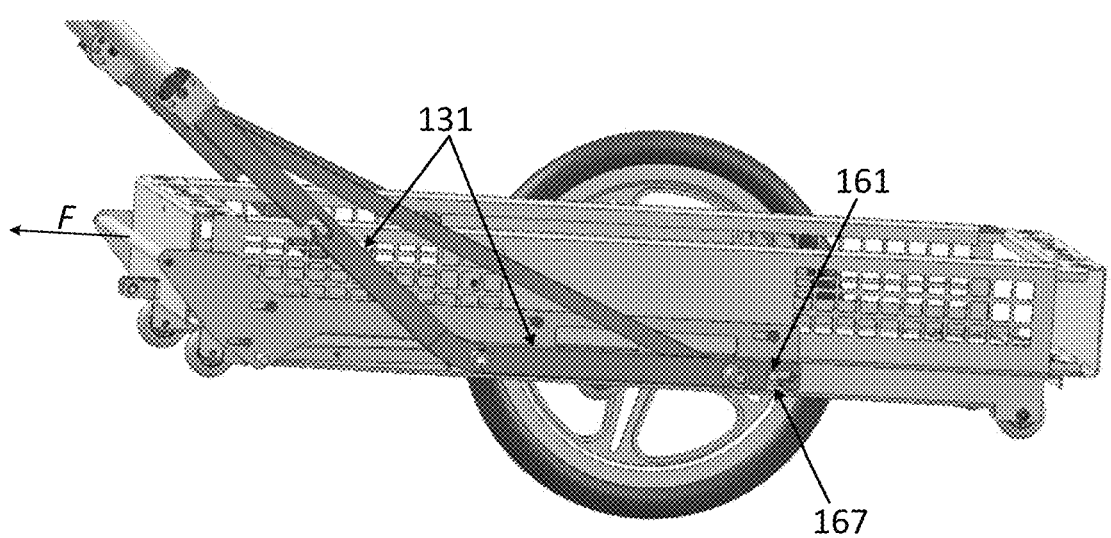
Figure 2C:
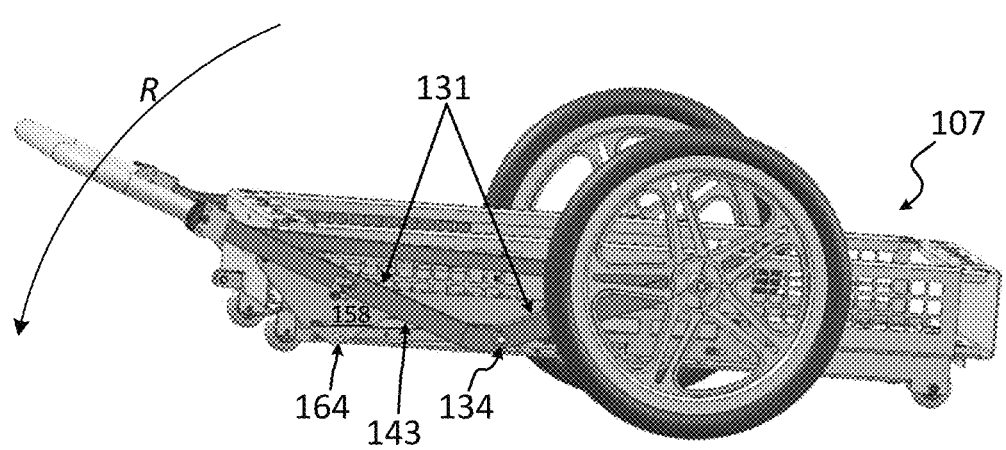

In one implementation, the above-described translation will cause the pin 161 to be translated to the same extent as the overall locking plate 158, which will align the pin 161 with the opening of the corresponding catch 167—as depicted in FIG. 2B. Once this alignment exists between the pin 161 and the catch 167 (e.g., once the catch 167 is positioned to allow for release of the pin 161), the assembly 131 can be rotated in the direction R, shown in FIG. 2C, about the pivot 134.

As the assembly 131 continues to be rotated, a user can again apply a force, F, on the handle 176 (see FIG. 2B), so as to again translate the locking plate 158 rearward, against the bias force of the spring member 173, such that the second locking pin 164 is aligned with the opening in the second catch 170—as the handle arm 143 of the assembly 131 approaches a position of being parallel with the length 152 of the cargo hold 107. Once the second locking pin 164 and second catch 170 are aligned, the user can release the force, F, on the handle 176, to engage the same in a locked configuration, in the stow configuration 122 (see FIG. 1C.)

Additional details of the exemplary utility cart 101 are now described with reference to FIG. 3, which is a perspective bottom view of the exemplary utility cart 101. As shown in one implementation, the utility cart 101 includes a plurality of bearing wheels, including rear bearing wheels 184, front bearing wheels 185, and, optionally, middle bearing wheels 186. In some implementations, the bearing wheels 184, 185 and 186 may be in-line skate wheels; in some implementations, the bearing wheels 184, 185 and 186 may be readily available high-capacity hard rubber, plastic, or polymer wheels. The wheels may be smooth or textured with grip. The wheels may be configured to resist wear. One or more pairs of wheels (e.g., wheels 184) may include an axle 187 (e.g., for stability or for other locking purposes, as will be described with reference to FIG. 7B); in some implementations, other wheels (e.g., wheels 185 and 186) may simply be bolted into a channel 188. In some implementations, as shown, the channel may have a plurality of mounting apertures 189 to facilitate adjustable positioning of one or more sets of wheels (e.g., wheels 186 as shown) along the length 152. The precise position of the various wheels 184, 185 and 186 may simplify loading of the utility cart 101 onto a corresponding rack 425, which is now described. In some implementations, only a single pair of bearing wheels (e.g., wheels 184) may be provided; other implementations may omit bearing wheels altogether.

Figure 4A:
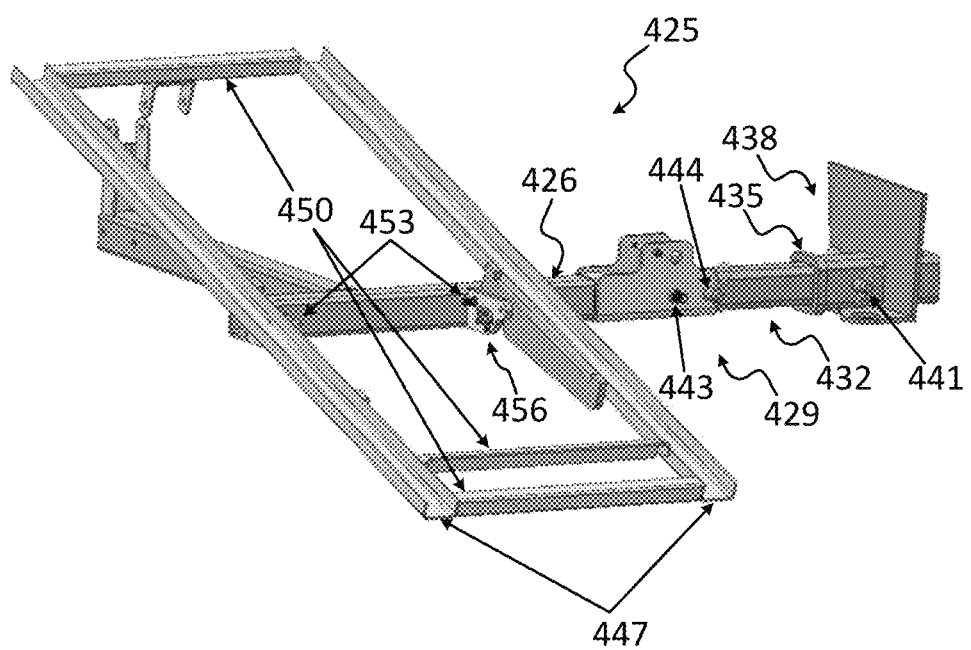
FIG. 4A is a perspective view of a vehicle hitch-mounted rack, in one implementation.

FIG. 4A is a perspective view of an exemplary vehicle hitch-mounted rack 425 that can be used with the exemplary utility rack 101. As shown, the rack 425 includes a rack arm 426, a rack pivot 429, and a hitch coupling member 432. The hitch coupling member 432 can be received by the hitch receiver tube 435 that is part of the vehicle hitch 438. A hitch pin 441 can secure the hitch coupling member 432 to the vehicle hitch 438.

In some implementations, as shown, the hitch coupling member 432 is a straight structural section. In other implementations (see FIG. 1B), the hitch coupling member 432 may have an "L" shape, such that the rack arm 426 is above or below the vehicle hitch 438 rather than being directly aligned therewith. Such implementations can facilitate mounting of the rack 425 on either a tall vehicle (e.g., a vehicle with a large ground clearance—with the "L" oriented such that the rack arm 426 is below the vehicle hitch 438) or on a short vehicle (e.g., a vehicle with a low ground clearance—with the "L" oriented such that the rack arm 426 is above the vehicle hitch 438). In still other implementations, the hitch coupling member 432 may have an adjustable component, to facilitate coupling at a variety of different heights.

As shown, the rack pivot 429 may pivot about a pivot point 443, and it may be locked into a load configuration, as shown in FIG. 4A, or a store configuration (not shown), in which the rack is perpendicular to the hitch coupling member 432 (e.g., for storage of the rack against the back of the hitch vehicle, to save space when the rack 425 is not in use). A locking pin 444 may lock the rack pivot 429 in either the load configuration or store configuration.

In some implementations, as shown in FIG. 4A (and in FIG. 4B from the side), the rack includes two tracks 447 that are configured to engage the bearing wheels 184, 185 and 186 that are described with reference to FIG. 3. In some implementations, the tracks 447 may be secured together and stabilized by cross pieces 450; in other implementations, the tracks 447 may be coupled to each other by a plate (e.g., a solid plate, or one with sections removed to reduce weight (not shown)), such that the tracks 447 are held in a fixed position relative to each other.

In some implementations, the tracks 447, as a fixed unit, may be rotated about a track pivot 453, to enable the ends of the tracks 447 to be lowered toward the ground (as shown) to facilitate loading of the utility cart 101. In some implementations, wheels (not shown) may be provided at the end of the tracks 447 (e.g., to contact the ground, and/or to facilitate loading of the cart). In some implementations, the range of pivot motion of the tracks 447 may be limited by an adjustable track-pivot stop 456, which is now described with reference to FIG. 4C.

Figure 4B:
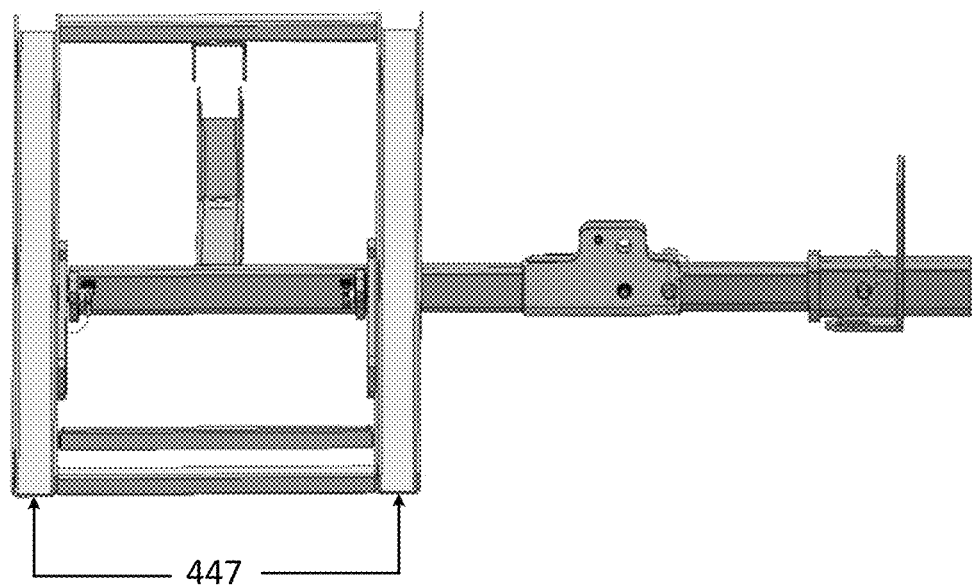
FIG. 4B is a side view of the vehicle hitch-mounted rack of FIG. 4A.
Figure 4C:
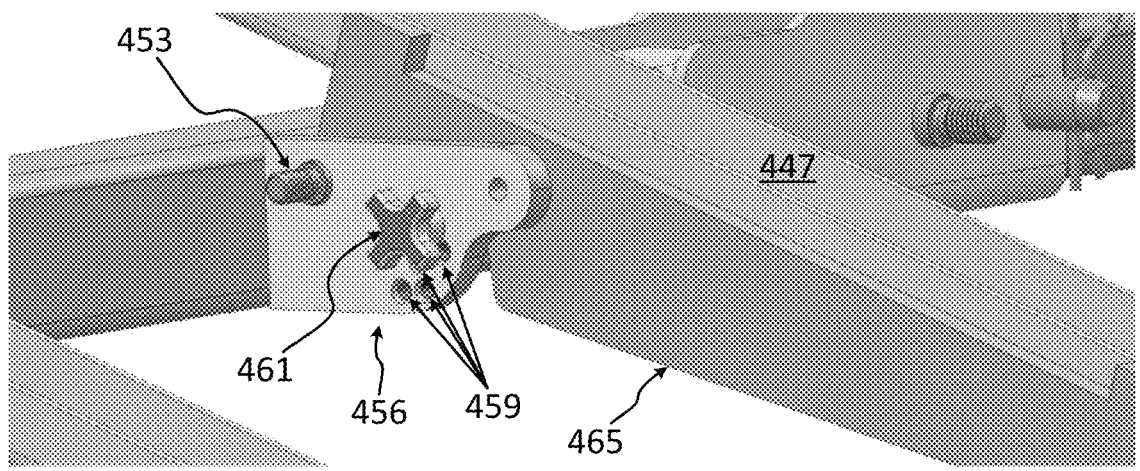
FIG. 4C illustrates detail of an exemplary track-pivot stop, in one implementation.

FIG. 4C illustrates an exemplary adjustable track-pivot stop 456 that can be used to limit an angle of possible rotation of the tracks 447. In particular, the track-pivot stop 456 may include a number of possible stop positions 459. In some implementations, the stop positions 459 are threaded receptacles that are configured to receive a corresponding threaded bolt, such as the threaded knob 461. Such a threaded knob 461 can be selectively disposed in any of the stop positions 459, to limit the rotation travel of the tracks 447—in particular, by limiting the rotational motion of a support member 465 for the tracks 447.

In some implementations, the adjustable track-pivot stop 456 can be employed to set a normal rotational operating range for the tracks 447, which may be configured based on a specific vehicle to which the rack 425 is mounted—and more particularly, a height of the corresponding vehicle hitch 438 of that vehicle. In some implementations, configuration of a limit on the rotational range of the tracks 447 can prevent the rack 425 from contacting the ground, which may prevent damage to the rack 425, simplify operation of the rack 425, and facilitate and simplify loading of a utility cart 101 on the rack 425.

Although a threaded knob 461 and corresponding threaded stop portions 459 are shown, other implementations may employ a threadless pin that may be secured, for example, with a compression fit or with a cotter pin or retaining pin. Some implementations of a rack 425 may omit an adjustable track-pivot stop altogether and may simply allow the tracks 447 and their support members 465 to rotate about the track pivot 453. In some implementations, speed of rotation may be controlled by brakes or dampening mechanisms (e.g., brake pads, ratcheting locks, springs (e.g., torsion springs), gas shock cylinders, etc.)—which may facilitate safe loading of a cart 101 on the rack 425 by preventing the tracks 427 from rotating too quickly about the track pivot 453. In still other implementations, the rack 425 may be fixed (and not facilitate rotation), relative to the rack arm 426.

Figure 4D:
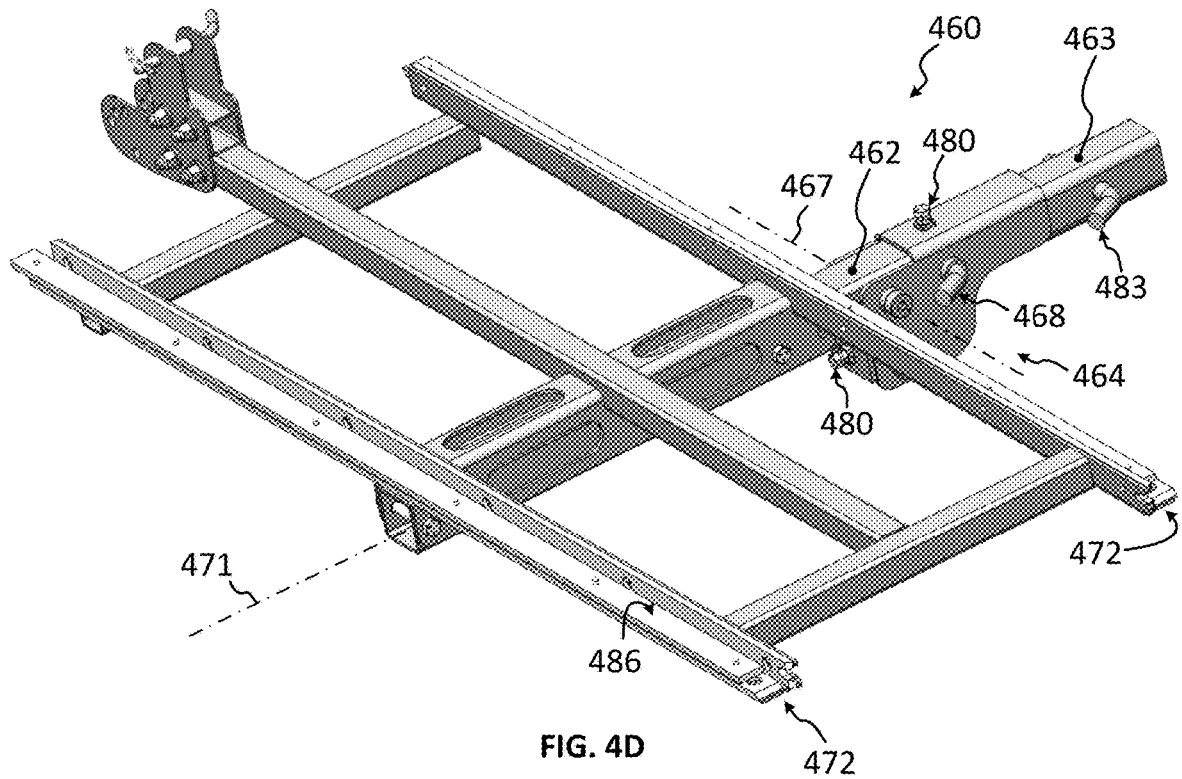
FIGS. 4D and 4E are perspective views of another exemplary vehicle hitch-mounted rack.
Figure 4E:
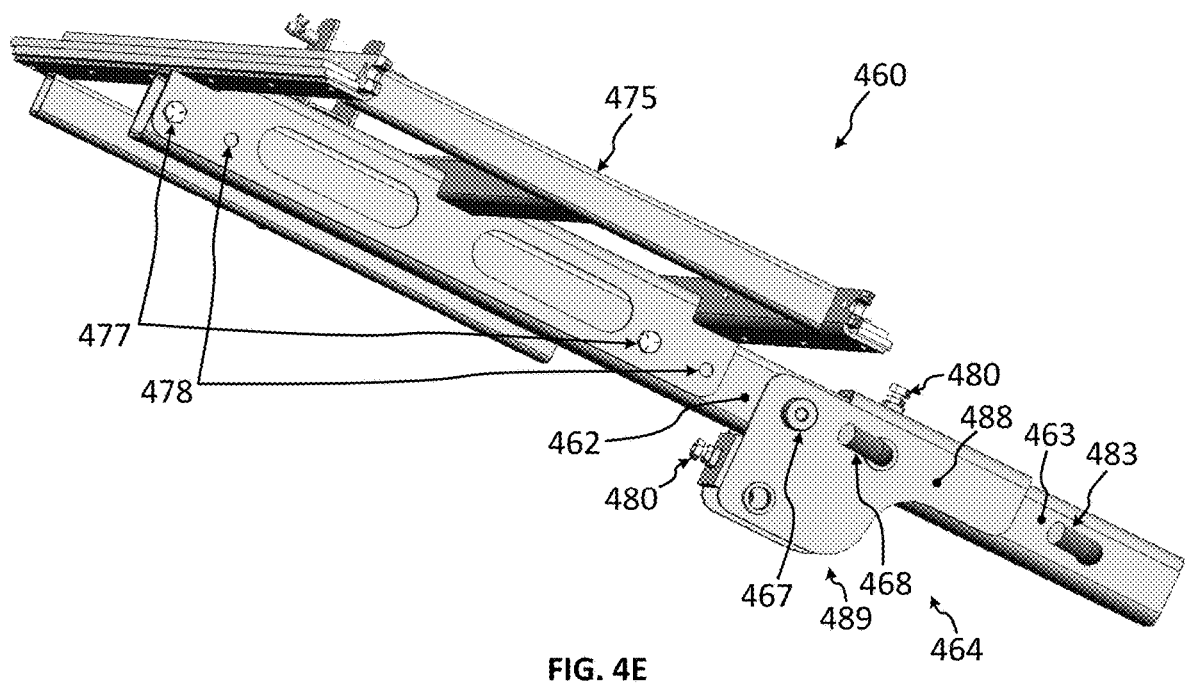

FIGS. 4D and 4E are perspective views of another exemplary vehicle hitch-mounted rack 460 that can be used with the exemplary utility vehicle 101. As shown, the rack 460 includes a rack arm 462, an anchor segment 463, a pivot bracket 464 that enables the rack arm 462 to pivot about an axis 467 relative to the anchor segment 463, a pin 483 that can secure the anchor segment 463 to a vehicle hitch (not shown), and a pin 468 that can secure the rack arm 462 to the pivot bracket 464. In the implementation shown, the rack 460 is rotationally fixed about an axis 471. Tracks 472 may be configured to accommodate a utility cart, such as the utility cart 101.

A length of the rack arm 462 may be adjustable. For example, a track support 475 may be mounted to the rack arm 462 at either a first location 477 or a second location 478. When mounting is at the first location 477, the rack 460 may be positioned closer to the tow vehicle; whereas when mounting is at the second location 478, the rack 460 may be extended, for example to accommodate a back-mounted spare tire on the tow vehicle.

Some implementations may include anti-vibration adjustments 480 to tighten components that may otherwise rattle, vibrate or shift when the rack 460 is mounted on a tow vehicle and hauling a utility cart. A standard locking pin 483 may be employed to anchor the rack 460 to a tow vehicle. The tracks 472 may include low-friction runners 486 to facilitate smooth loading and unloading of a utility cart.

Relative to the implementation shown in FIGS. 4A and 4B, a pivot bracket 488 may be positioned such that its portion 489 that extends beyond the rack arm 462 is disposed below that rack arm 462, rather than above it—providing more room for wheels of a corresponding utility cart, in some implementations.

Figure 5:
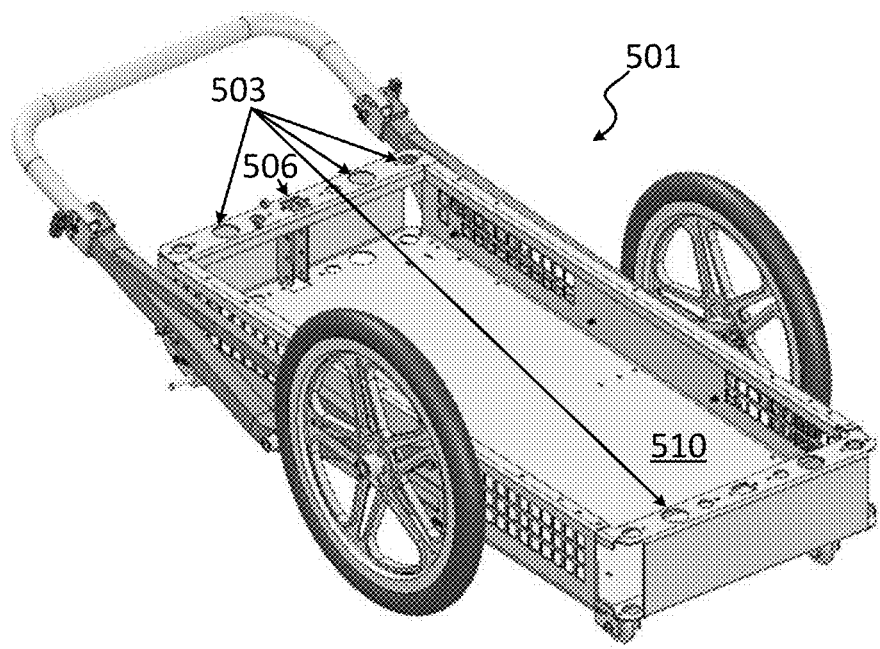
FIG. 5 is a perspective view of an exemplary utility cart.

Turning to FIG. 5, additional features of an exemplary utility cart 501 are now described. As shown, the exemplary utility cart 501 may include various stake pockets 503 on either or both ends of the utility cart 501, as shown, and/or, in some implementations, on the sides. Such stake pockets 503 may be employed to secure additional accessories to the utility cart 501—e.g., vertically secure fishing poles, recreational equipment, tools, other accessories designed to ride on a cargo bed 510, etc. In some implementations, locking accessories may be provided that interface with the stake pockets 503, to securely couple or lock various accessories to the cart 501; the cart to a rack 425; the rack 425 to a vehicle; etc. For example, tie-downs, bungee cords, clips, straps, etc. can be provided or affixed to either or both of the cart 501 and rack 425 to secure one to the other.

Figure 6:
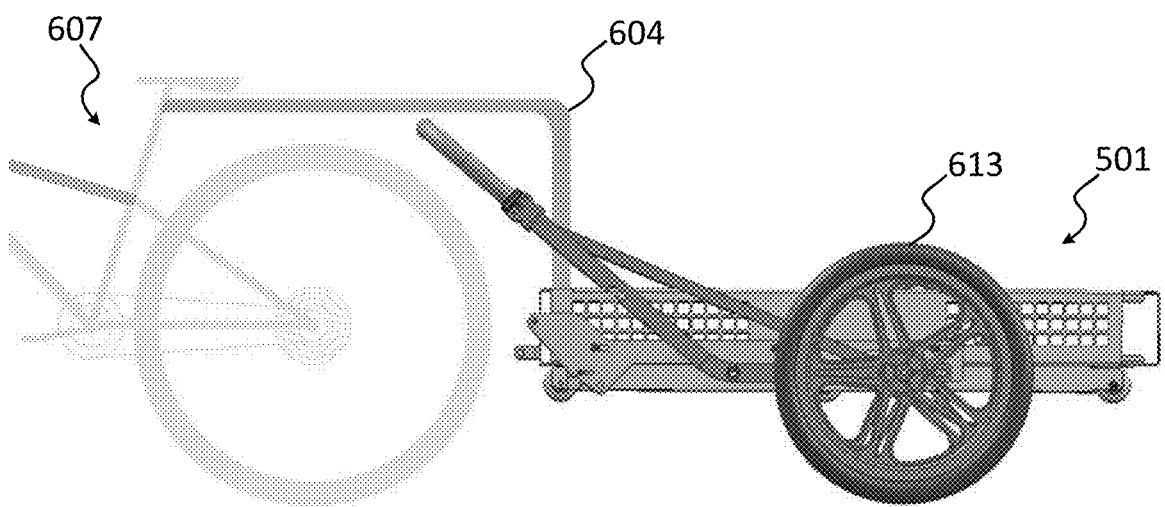
FIG. 6 is a side view illustrating one application of the exemplary utility cart of FIG. 5.

In some implementations, one or more of the stake pockets, such as stake pocket 506, may be reinforced, for example, as shown. Such a reinforced stake pocket 506 may be employed with another accessory, such as a gooseneck towing adapter 604 to couple the utility cart 501 to a bicycle 607, as shown in FIG. 6.

In other implementations, other towing accessories may be employed, such as accessories to couple the utility cart 501 directly to a vehicle, all-terrain vehicle (ATV), utility vehicle, etc. In some implementations, wheels 613 may be replaced with skis or a sled, such that the utility cart 501 can be towed over snow or ice (e.g., by a snowmobile or ATV). In other implementations, floats (not shown) may be employed to facilitate towing of the utility cart 501 over water (e.g., by a powered or unpowered boat, canoe, kayak, etc.).

Figure 7A:
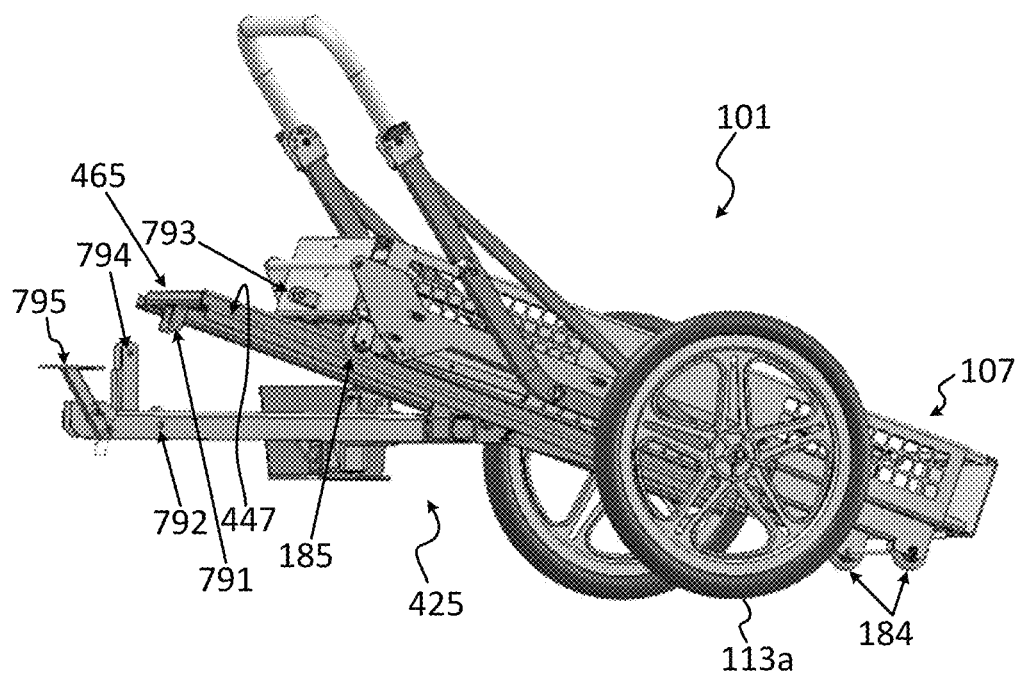
FIG. 7A depicts an exemplary process of loading a utility cart onto a rack.
Figure 7B:
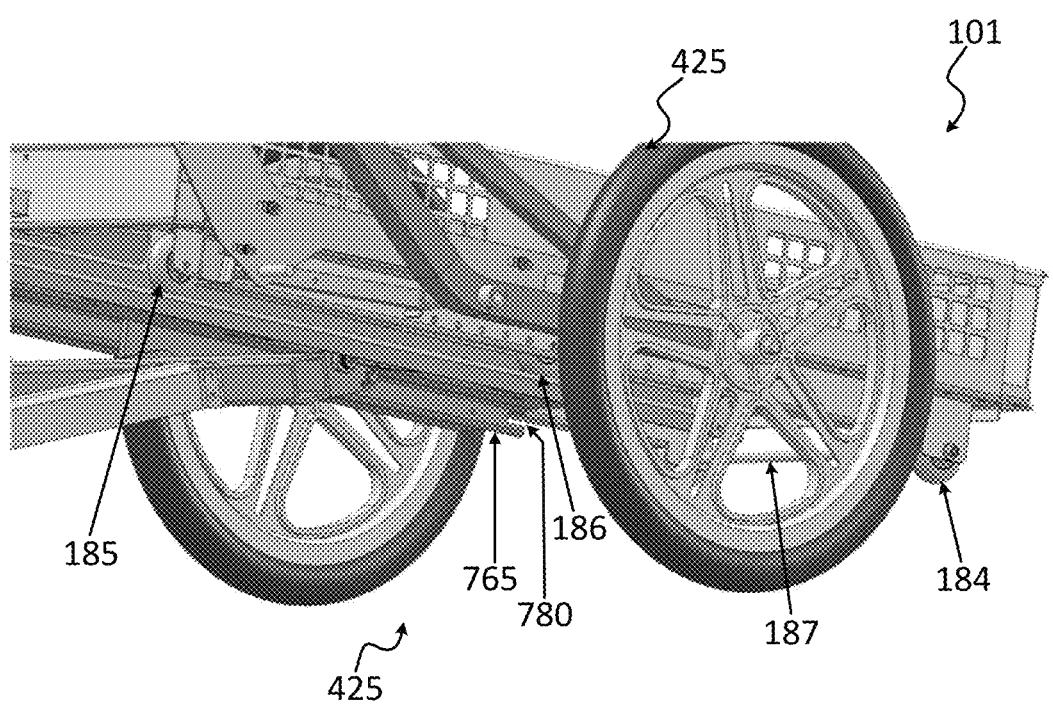
FIGS. 7B and 7C illustrate additional features that can facilitate loading a utility cart onto a rack and stowing the same.

Turning now to FIGS. 7A and 7B, additional details are described regarding loading an exemplary utility cart 101 onto an exemplary rack 425. As shown, the tracks 447 on the rack 425 have been rotated down, toward the ground, to facilitate loading of the cart 101. Rear bearing wheels 184 are shown on the tracks 447. Middle bearing wheels, if present (e.g., middle bearing wheels 186, shown in FIGS. 3 and 7B; not visible in FIG. 7A because of the position of wheel 113a), are also on the tracks 447 and further facilitate loading of the cart 101. Rear bearing wheels 184 are shown suspended off the ground in FIG. 7A; but these rear bearing wheels 184 may remain in contact with the ground as the cart 101 is initially loaded onto the rack 425, preventing, in some implementations, other portions of the cargo hold 107 from contacting the ground as the cart 101 is rotated upward during the loading process.

FIG. 7B illustrates the cart 101 and rack 425 in a later stage of loading. As shown, the rack 425 has pivoted closer horizontal as the cart 101 is nearly stowed on the rack 425. In some implementations, as shown in more detail in FIG. 7C, a support member 765 for the tracks 447 includes a notch 780 that may accommodate the axle 187, when the cart 101 is fully loaded onto the rack 425. In some implementations, notches 780 pinch the axle 187 when the cart 101 is fully stowed. This may allow the rack 425 to more firmly secure the cart 101 and prevent, or minimize, vibrations and/or movement of the cart 101 during transport (e.g., while a vehicle to which the rack 425 is secure is moving).

Figure 7C:
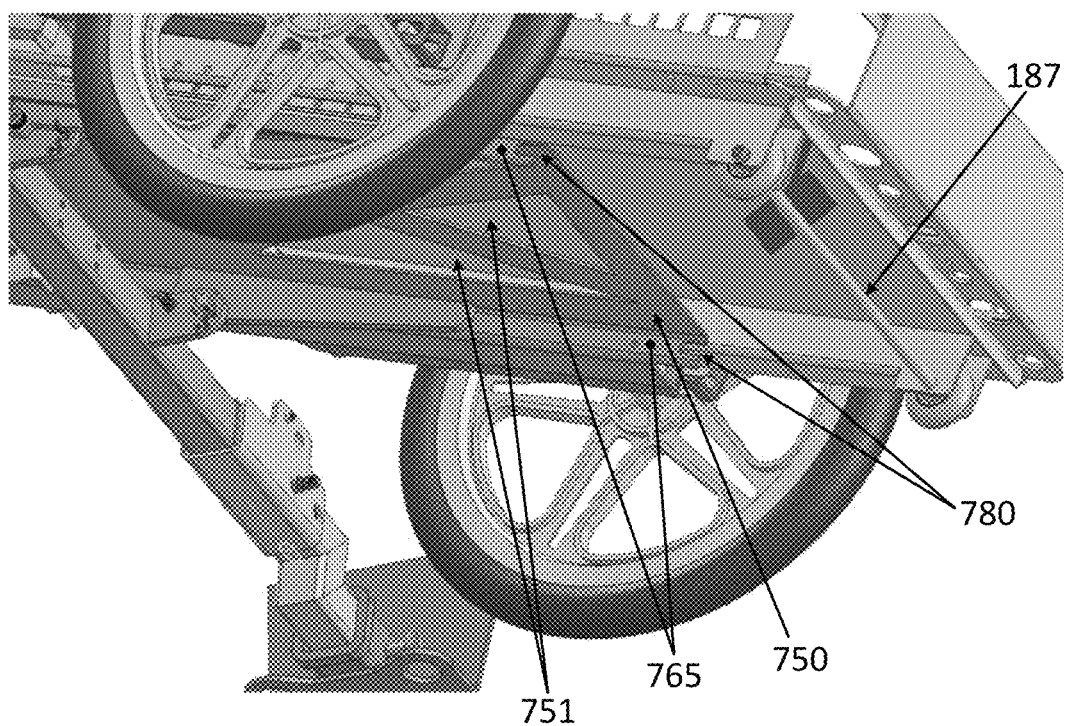

Also shown in FIG. 7C is an exemplary support plate 750 that can, in some implementations, replace the cross pieces 450 shown in FIG. 4A. As shown, the support plate 750 may have various cutouts 751—for example, to reduce weight while still providing sufficient strength and support for the support members 765.

With reference again to FIG. 7A, some implementations may include additional features. In particular, locking apertures 791 may be coupled to or integrated with support member 465; and such locking apertures 791 may be configured to interface with corresponding apertures 792 on a non-rotating portion of the rack 425, such that the rack 425 can be fixed in a non-rotatable state (e.g., when the rack 425 is in a stowed position, or when the cart 101 is secured to the rack 425) with a pin, cotter pin, bolt or other retaining mechanism. Similarly, locking apertures 793 may coupled to or integrated with the cart 101 and configured to interface with corresponding apertures 794 on the rack 425, to facilitate securing the cart 101 to the rack 425 with a similar retaining mechanism (e.g., pin, cotter pin, bolt, etc.). A mount 795 may be provided for a winch or other device to assist in loading the cart 101 onto the rack 425. Such a winch (not shown) may be a hand-crank winch; or the winch may be a powered winch, such as one that may be used with or on an ATV. In implementations with winches or other devices for loading or securing the cart 101 to the rack 425, other pulleys, cables, guides, etc. may be employed.

Figure 8A:
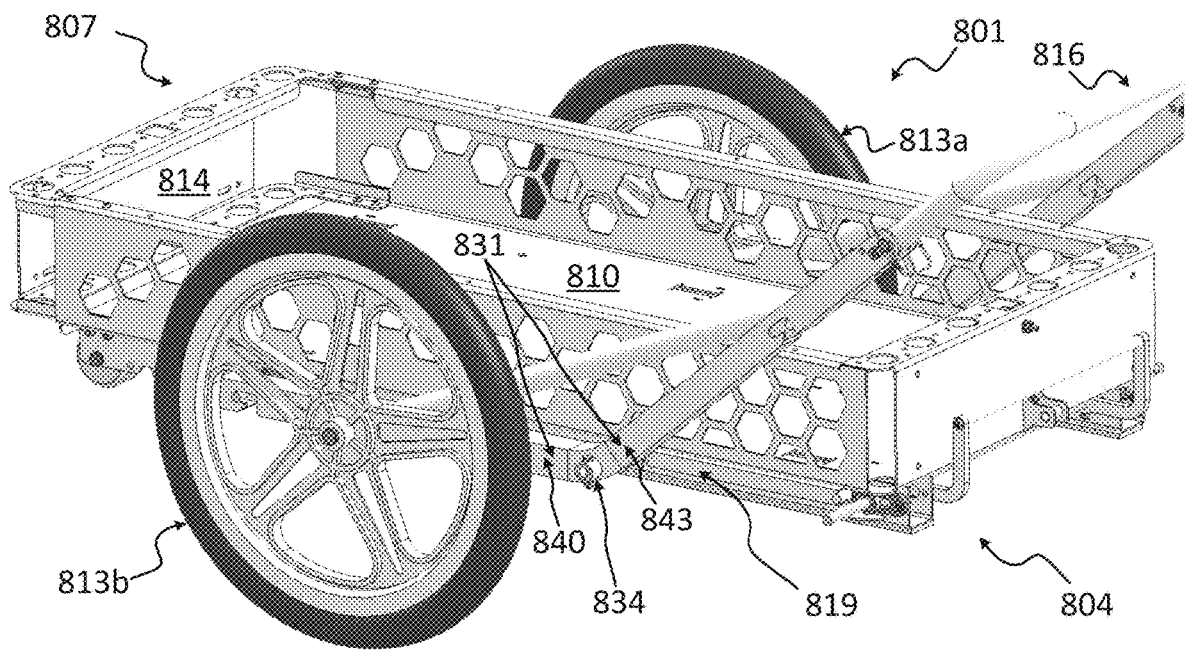
FIG. 8A is a perspective view of another exemplary utility cart, shown in a transport configuration.

FIG. 8A is a perspective view of another exemplary utility cart 801, shown in a transport configuration 804—where it is configured to transport or haul objects of various types. The utility cart 801 includes a cargo hold 807 and cargo bed 810, a pair of transport wheels 813*a* and 813*b*, and a handle 816. The utility cart 801 may also include a kickstand 819 (or more than one kickstand, such as one kickstand on each side) for stability in the transport configuration 804. A rear wall 814 is included that may, in some implementations, be removable. The handle 816 may include, or be coupled to, a handle arm 843 and a wheel arm 840 that together comprise an assembly 831 that can rotate about a pivot point 834.

Figure 8B:
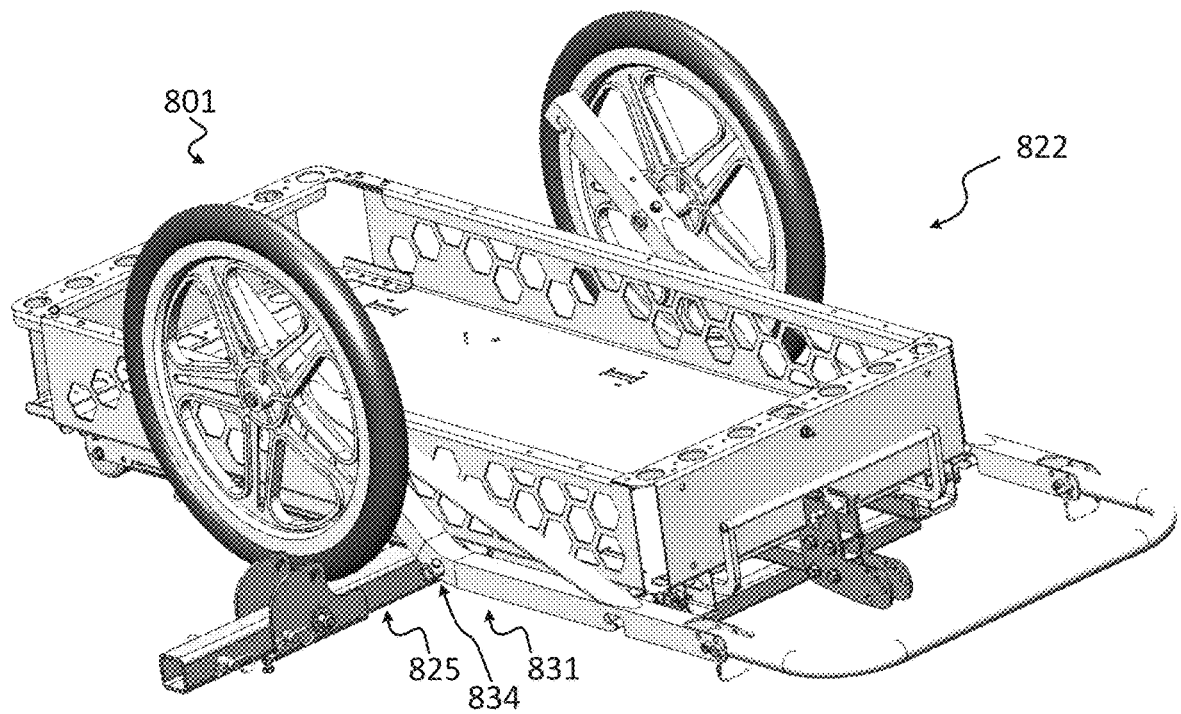
FIG. 8B is a perspective view of the exemplary utility cart of FIG. 8A, shown in a stow configuration on a vehicle hitch-mounted rack.

FIG. 8B is a perspective view of the exemplary utility cart 801, in which the assembly 831 has been rotated about the pivot point 834 to facilitate securing the utility cart 801 to a rack 825, in a stow configuration 822. As in other implementations, the rack 825 may be configured to be mounted to a vehicle hitch.

Figure 8C:
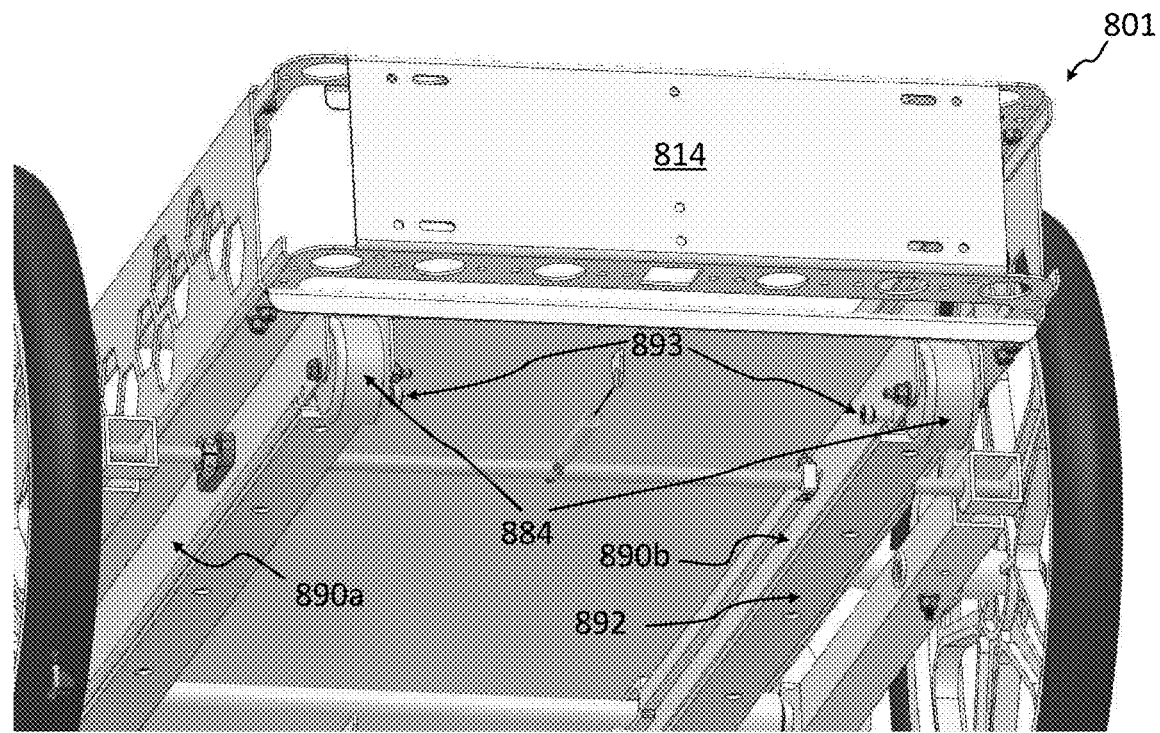
FIG. 8C is a perspective bottom view of the exemplary utility cart of FIG. 8A, showing one implementation of a support structure.

FIG. 8C is a perspective bottom view of the exemplary utility cart 801, showing one implementation of a support structure. As shown, structural members 890*a* and 890*b* may form "skis" that enable the utility cart 801 to slide along a portion of the rack 825 (e.g., as the utility cart 801 is being loaded onto the rack 825). In some implementations, the structural members 890*a* and 890*b* are constructed from square tubular stock (e.g., steel, aluminum, a suitable alloy, etc.) and may include a low-friction surface 892 (e.g., polytetrafluoroethylene (PTFE) or other suitable material) that can be replaced when worn.

In some implementations, as shown, the structural members, 890*a* and 890*b*, can accommodate bearing wheels 884, which may be configured to slide along tracks associated with the rack 825. The bearing wheels 884 may be secured to a portion of the structural members 890*a* and 890*b* with bolts (as shown) or other suitable fasteners; and the bearing wheels 884 may be accommodated by cutouts of portions of the structural members 890*a* and 890*b*. Stabilizing pins 893 may also be included and attached to the structural members 890*a* and 890*b*.

Figure 8D:
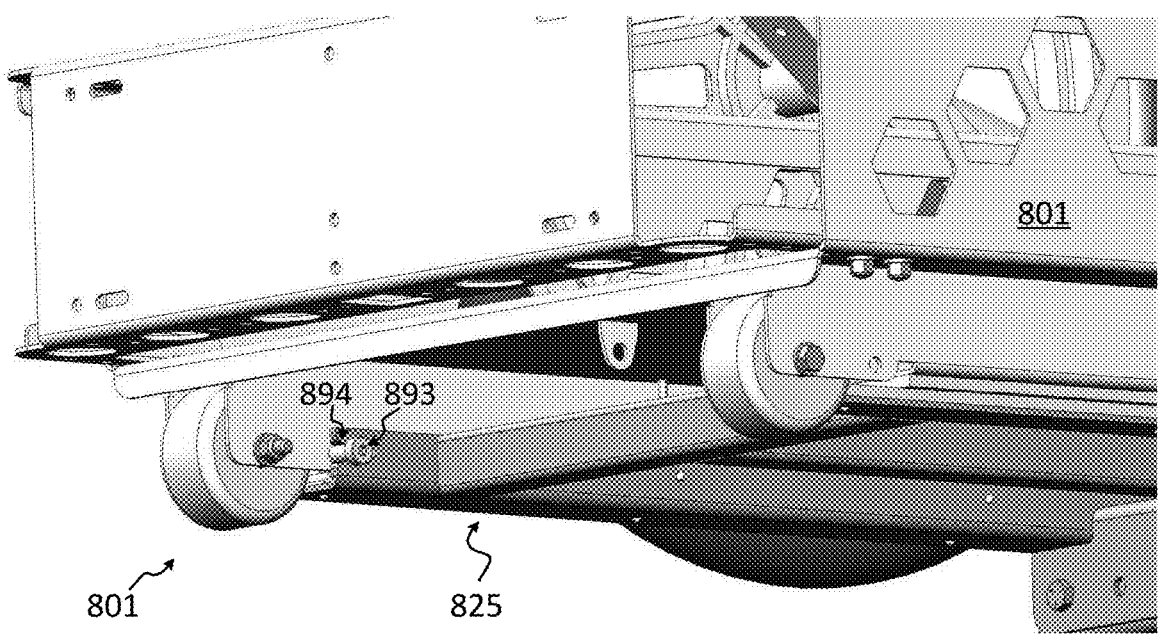
FIG. 8D is a perspective bottom view of the exemplary utility cart of FIG. 8A, showing engagement of the cart and rack, in one implementation.

FIG. 8D is a perspective bottom view of the utility cart 801, showing engagement of the cart and rack, in one implementation. Specifically, a rear end of the utility cart 801 may be secured to the rack 825 by a stabilizing pin 893 engaging with a corresponding notch 894 (e.g., a progressively narrowing notch that pinches the stabilizing pin 893). In some implementations, the stabilizing pin may extend through the structural members 890*a* and 890*b* (e.g., be welded, bolted or otherwise affixed to both sides of such structural members, like stabilizing pins 1592*a* and 1592*b*, shown in FIG. 15A). At its front end, the utility cart 801 may be secured to the rack 825 with another securing mechanism (not shown, but in accordance with other described implementations).

Figure 9A:
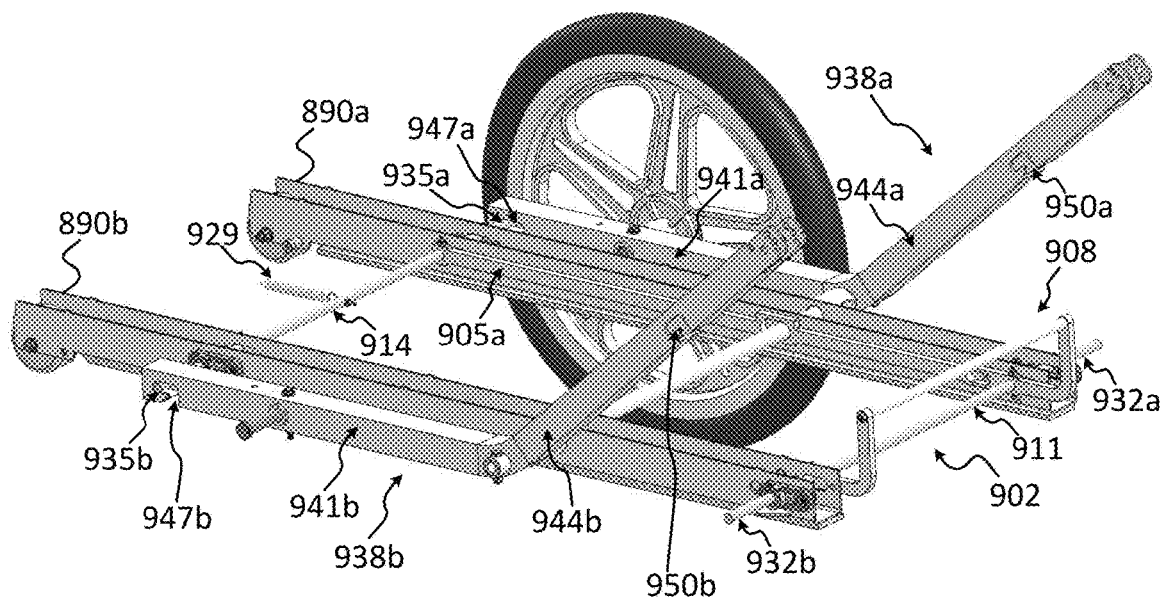
FIG. 9A is a perspective view of an exemplary locking mechanism.
Figure 9B:
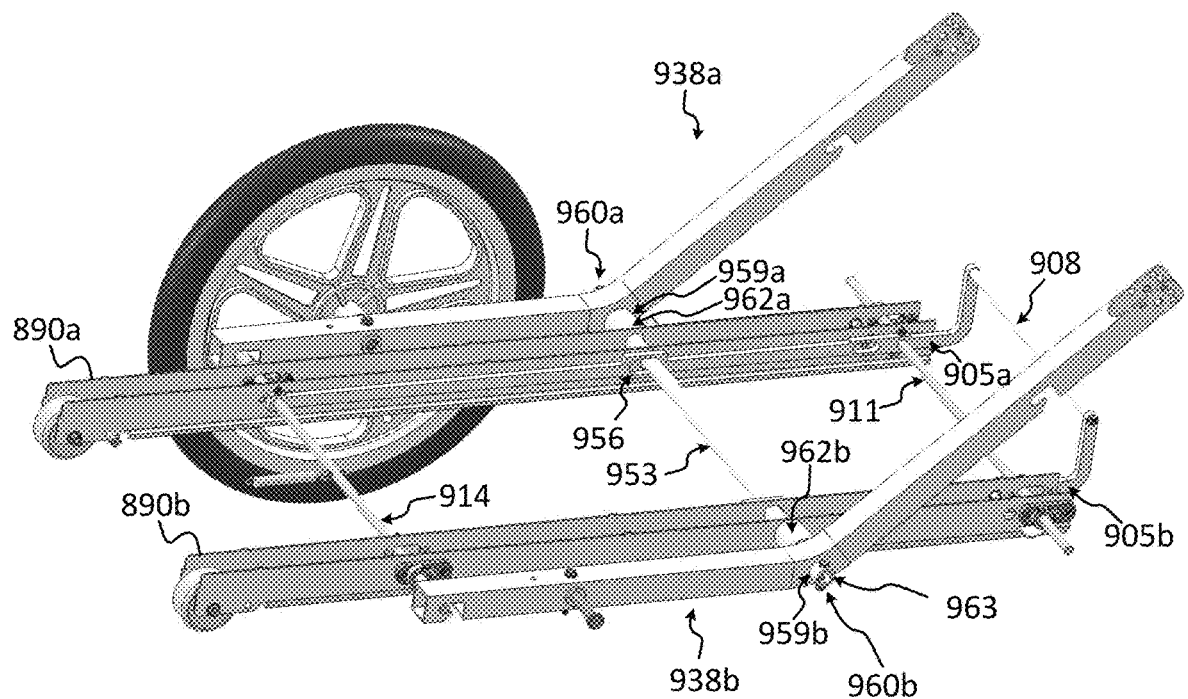
FIG. 9B is another perspective view of the exemplary locking mechanism of FIG. 9A.
Figure 9C:
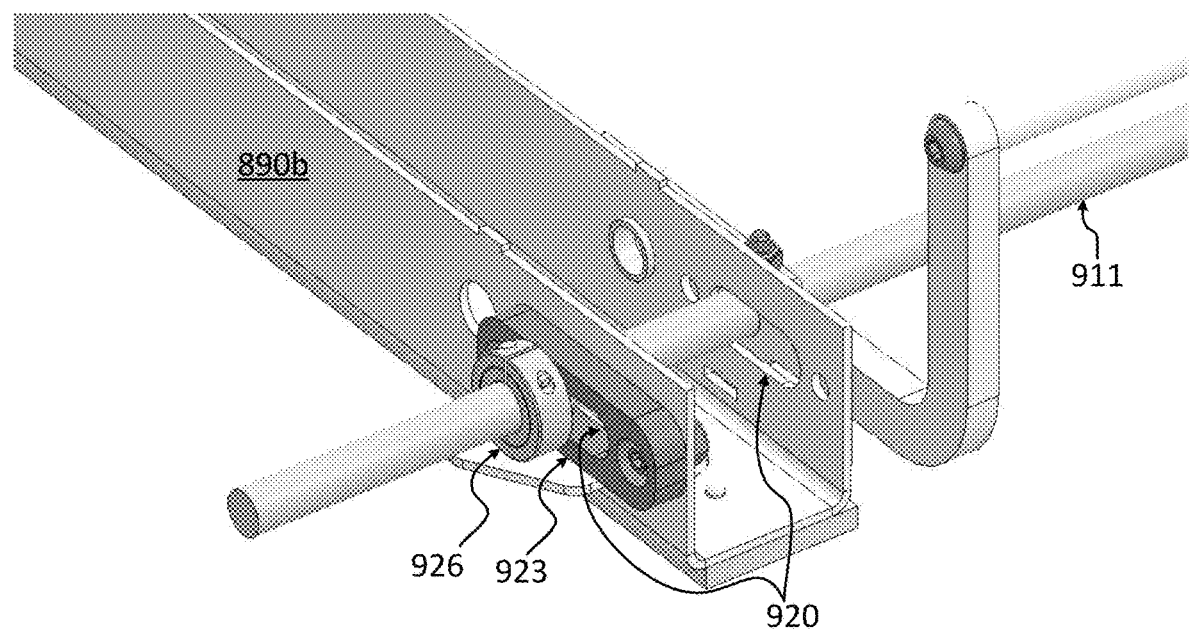
FIG. 9C shows additional detail of the exemplary locking mechanism of FIG. 9A.
Figure 9D:
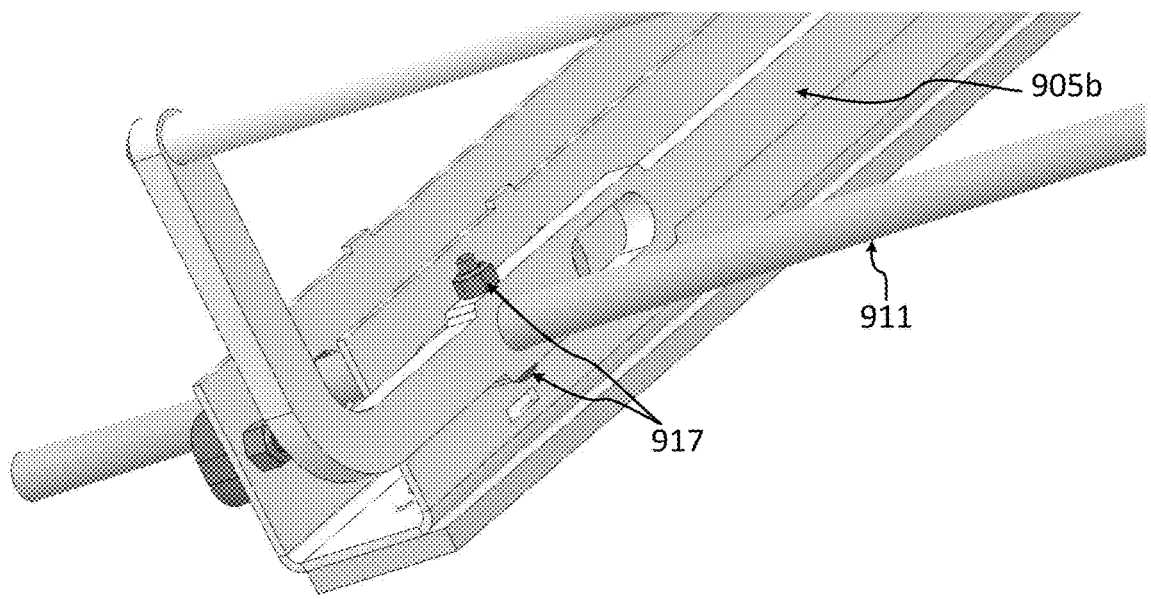
FIG. 9D shows additional detail of the exemplary locking mechanism of FIG. 9A.

FIGS. 9A-9D illustrate various aspects of another exemplary locking assembly 902. As shown, the locking assembly 902 includes translatable side bars 905*a* and 905*b* that are coupled to a handle 908. As shown, the side bars 905*a* and 905*b* are coupled to each other by cross pieces 911 and 914. In some implementations, a bolt or other fastening mechanism 917 may be disposed through each side bar (e.g., side bar 905*b*), for example, perpendicular to and through a corresponding cross piece (e.g., cross piece 911) (see FIG. 9D). Slots in the structural members 890*a* and 890*b* allow the locking assembly 902 to be translated forward or backward relative to the length of the structural members 890*a* and 890*b*. For example, as shown in FIG. 9C, slots 920 may facilitate translation of the locking assembly 902 within the extent of the slots 920. In some implementations, an elongated bushing or wear member 923 can provide support for each cross piece (e.g., cross piece 911) and may further provide a low-friction surface to facilitate translation of the locking assembly 902 under a load. The cross piece 911 may be further secured in place by a shaft collar 926 or other fastening device. As shown in FIGS. 9A and 9B, opposite the handle 908, a biasing element 929 (e.g., a spring, coupled to the cargo bed (not shown) or other structural member) may be disposed to bias the locking assembly 902 in one position (e.g., toward the front of the utility cart, as shown).

In some implementations, as shown, each cross piece 911 and 914 may extend past the structural members 890*a* and 890*b*, and the ends may function as locking pins 932*a*, 932*b*, 935*a* and 935*b* to secure in place arm assemblies 938*a* and 938*b*—each of which comprise wheel arms 941*a* and 941*b* and handle arms 944*a* and 944*b*. In particular, the wheel arms 941*a* and 941*b* may include first catches 947*a* and 947*b* that are configured to engage the locking pins 935*a* and 935*b*; and second catches 950*a* and 950*b* that are configured to engage the locking pins 932*a* and 932*b*. The side bars (e.g., side bar 905*a* and its counterpart, not visible) may maintain the cross pieces 911 and 914 (and the corresponding locking pins 932*a* and 932*b* and locking pins 935*a* and 935*b*) in a fixed relationship relative to each other—such that as locking pins 932*a* and 932*b* move (e.g., as the handle 908 (see FIG. 9B) is translated), so also do locking pins 935*a* and 935*b* move.

As shown in FIG. 9B, a pivot axle 953 may be disposed through the structural members 890*a* and 890*b*; through slots in the side bars 905*a* and 905*b* (e.g., slot 956); and through apertures 959*a* and 959*b* at pivot points 960*a* and 960*b*, enabling the arm assemblies 938*a* and 938*b* to be rotated between a first position in which the wheel arms 941*a* and 941*b* are parallel to the structural members 890*a* and 890*b*, and a second position in which the handle arms 944*a* and 944*b* are parallel to the structural members 890*a* and 890*b*. A shaft collar 963 or other coupling mechanism (cotter pin, bolt, etc.) may secure the arm assemblies 938*a* and 938*b* to the pivot axle 953. Bushings 962*a* and 962*b* may be provided to appropriately space the arm assemblies 938*a* and 938*b* from the structural members 890*a* and 890*b*.

In the implementation just described, the structure of the cross pieces 911 and 914 and side bars 905*a* and 905*b* may provide greater strength, stability and load-carrying capacity than in other implementations.

Figure 10:
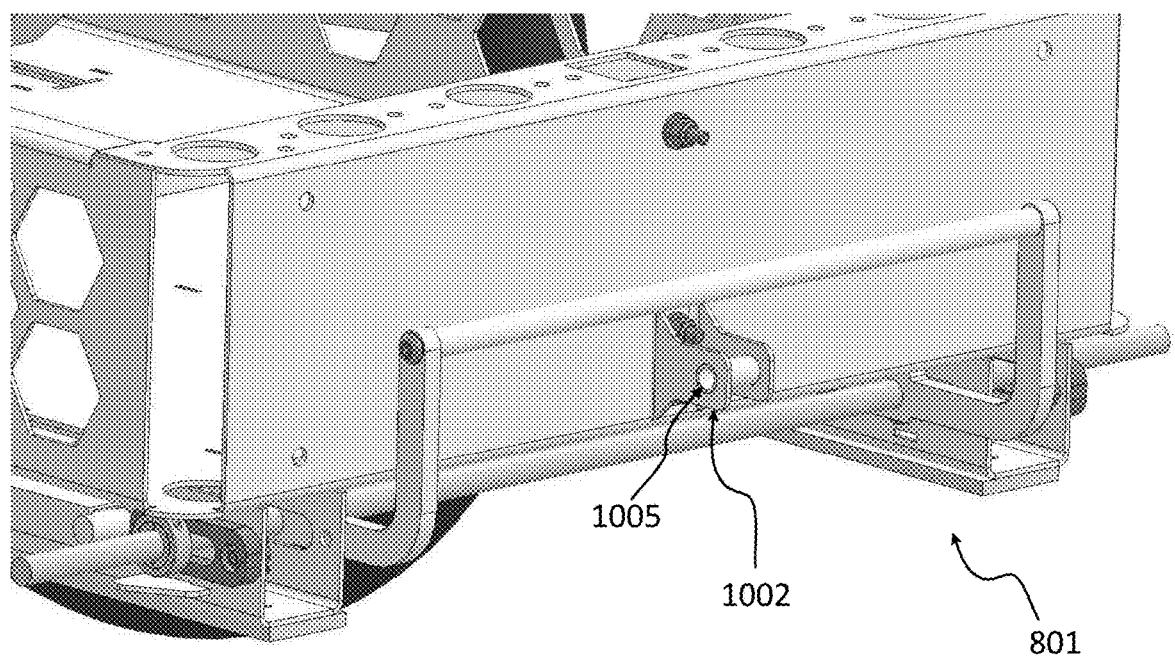
FIG. 10 illustrates an exemplary ATV attachment.

In some implementations, the utility cart 801 can include a hitch or other attachment for coupling the cart to a tow vehicle. For example, as illustrated in FIG. 10, the cart can include a hitch coupler 1002, such as a hitch coupler that could be used with an all-terrain vehicle (ATV). In some implementations, as shown, the hitch coupler 1002 may include an aperture or slot 1005 that is configured to be engaged by a hitch bar, tongue, coupling member, etc. on the tow vehicle.

Figure 11:
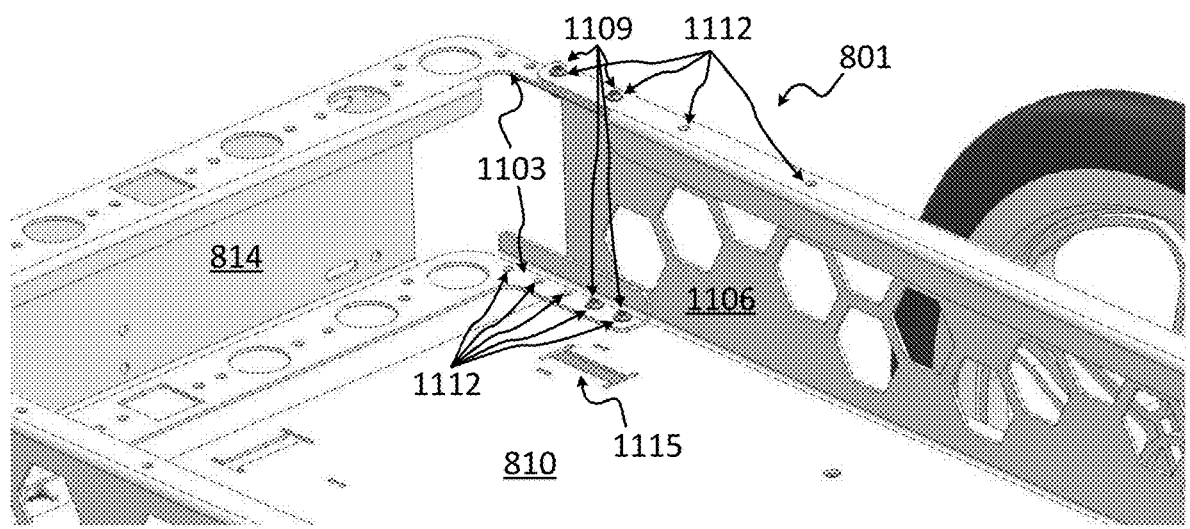
FIG. 11 illustrates an exemplary adjustable basket.

In some implementations, as illustrated in FIG. 11, a rear panel 814 of the utility cart 801 may be adjustable or removable. For example, structural members 1103 of the rear panel 814 may be secured to the bottom panel 810 and a side panel 1106 of the utility cart 801 with one or more fasteners 1109 and that may be optionally disposed at various optional positions 1112— enabling the rear panel to be extended behind the bottom panel to accommodate larger loads. Alternatively, the rear panel 814 may be completely removed to accommodate still larger loads or to facilitate loading of the same (e.g., toolboxes, coolers). As shown, the bottom panel 810 may include one or more retention apertures 1115, for example, to interface with tie-down cables, bungee cords, specialized retention connectors, etc.

Figure 12:
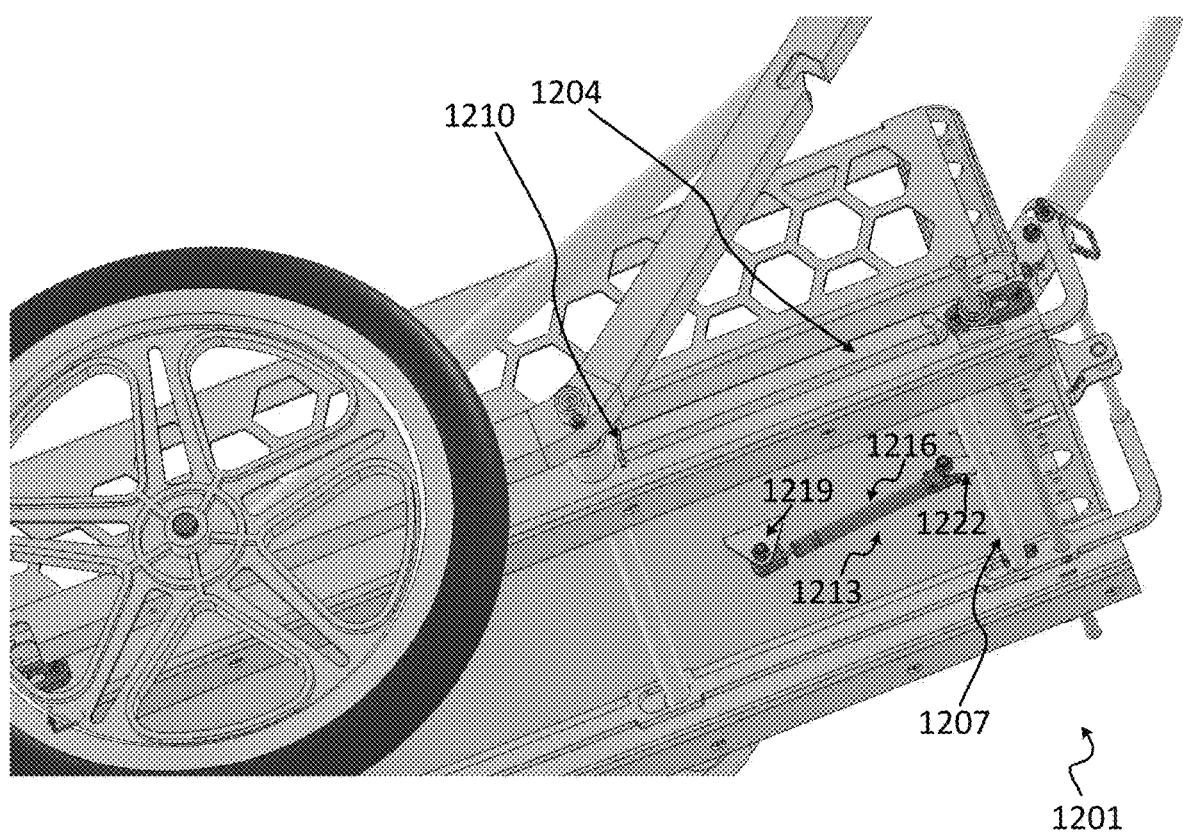
FIG. 12 illustrates an exemplary kickstand design.

FIG. 12 illustrates details of an exemplary kickstand system 1201. As shown in one implementation, the kickstand system may include a kickstand on either side of the cart (only kickstand 1204 shown in FIG. 12), coupled together and rotatably secured to the cart with a rod 1207. Each kickstand 1204 and may have an angled base plate 1210 that facilitates support of a rear end of the cart when the kickstand system 1201 is deployed by being rotated about the rod 1207. A biasing mechanism 1213 may be included to bias the kickstand system 1201 in a stowed configuration when it is not in use. For example, in one implementation, as shown, the biasing mechanism 1213 may be a pneumatic strut 1216 that couples a tab 1219 on the utility cart 801 with a tab 1222 on the rod 1207 so as to bias the kickstand system in a clockwise direction (as shown, from the left side of the utility cart 802) and in a stowed position. In other implementations, the biasing mechanism 1213 may be a spring. In still other implementations, the biasing mechanism 1213 may be replaced by another locking mechanism, such as a detent or pin system.

Figure 13A:
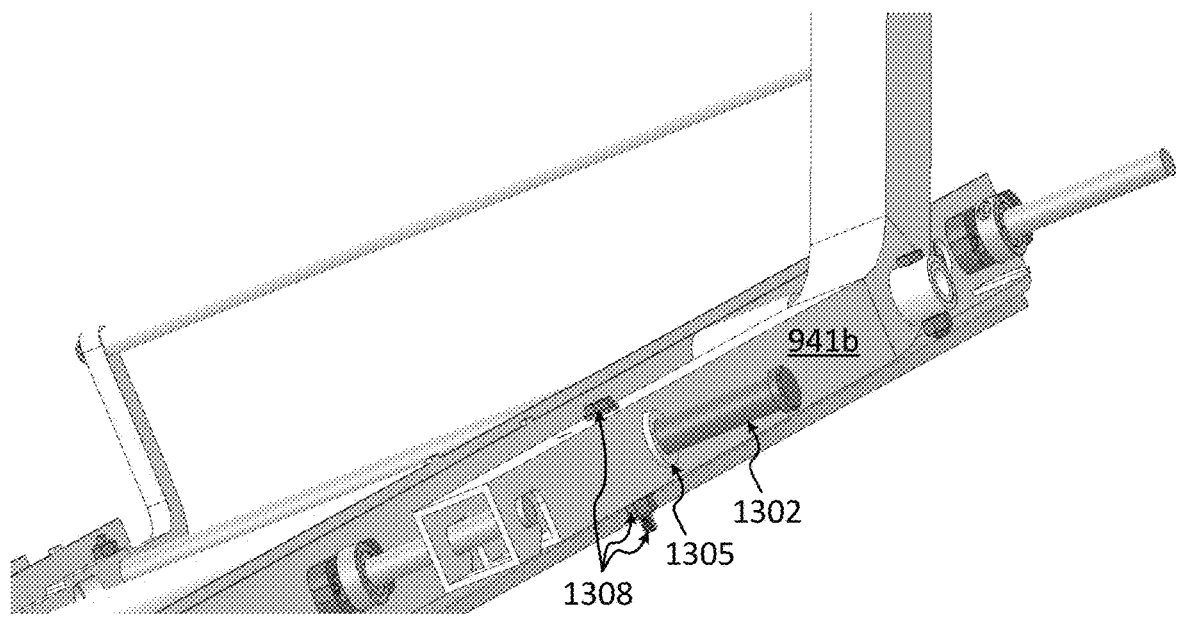
FIG. 13A illustrates an exemplary axle design.
Figure 13B:
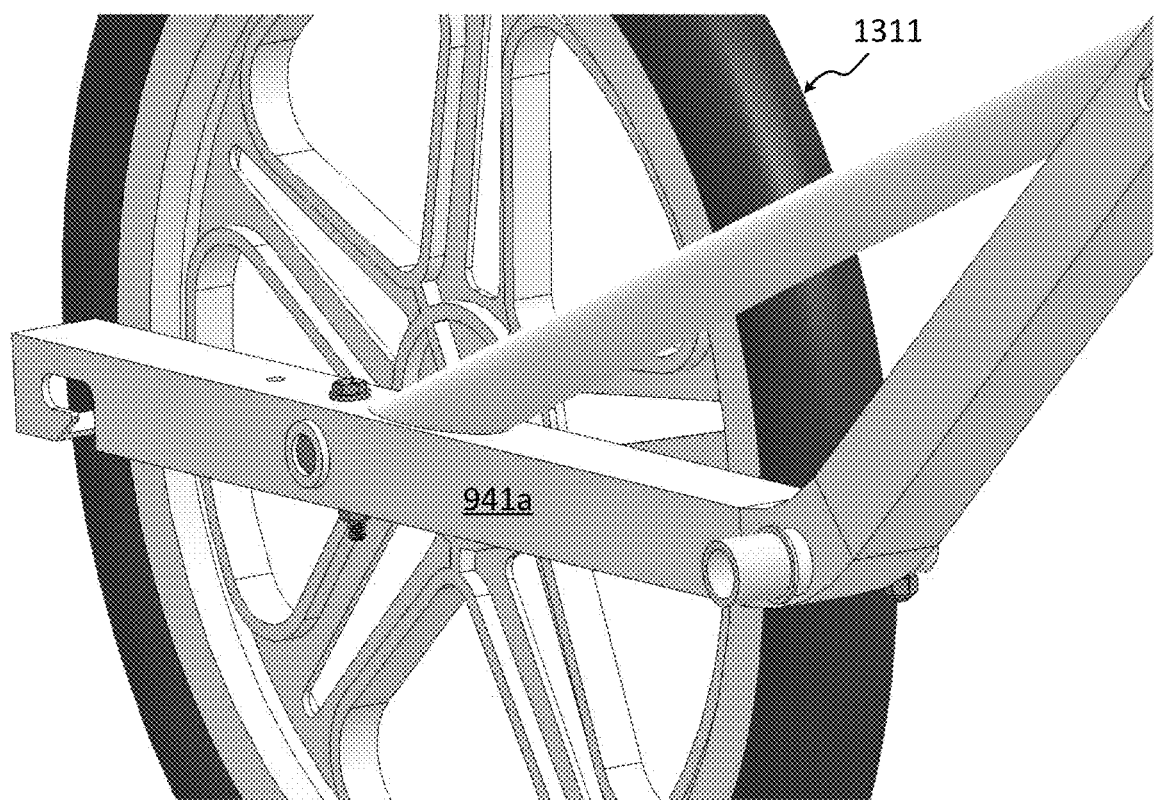
FIG. 13B illustrates a standard tire installed on the axle of FIG. 13A.

FIG. 13A illustrates an exemplary axle design. As shown, an axle pin 1302 may be mounted in and through each wheel arm (e.g., wheel arm 941*b*). A bushing 1305 may be employed to provide additional load-bearing support, and the axle pin 1302 and bushing 1305 may be secured to the wheel arm 941*b* with a fastener 1308 (e.g., a bolt and locking nut) disposed through a longitudinal axis of the axle and bushing. FIG. 13B illustrates a standard tire 1311 installed on an axle pin.

Figure 13C:
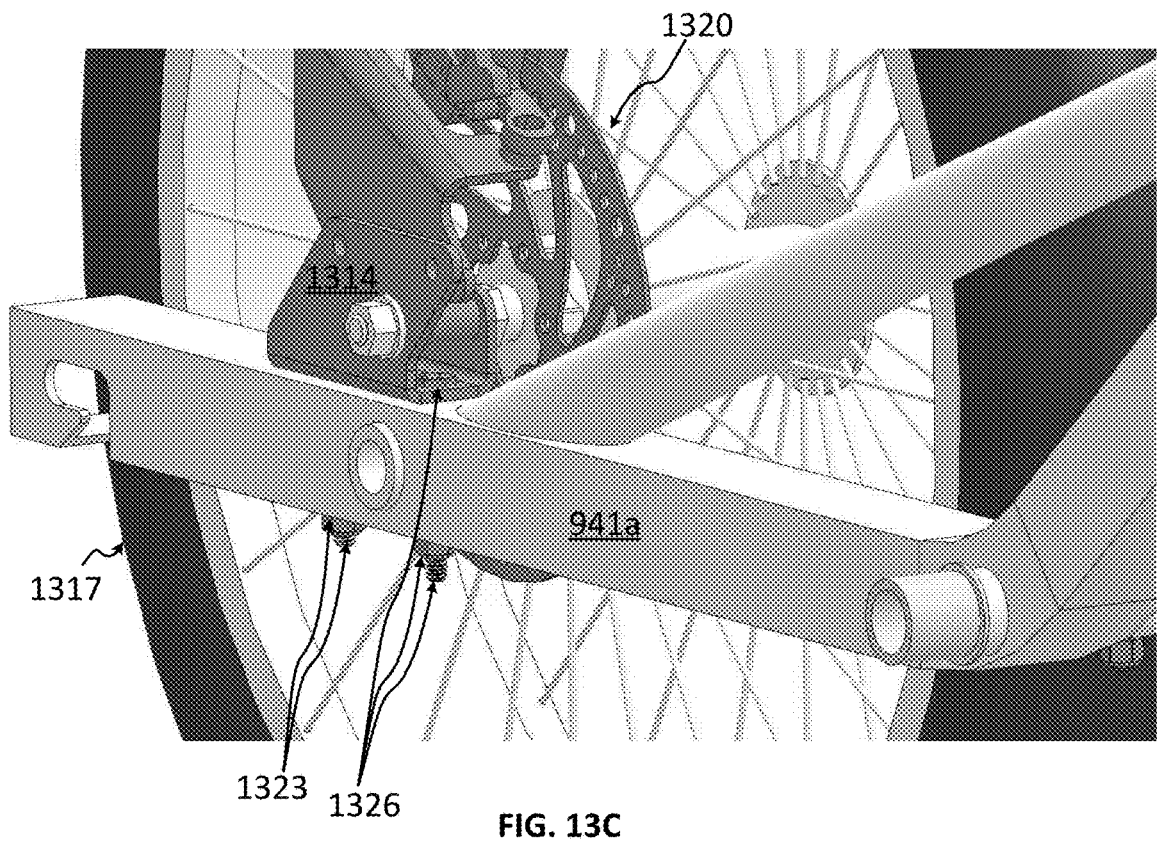
FIG. 13C illustrates an exemplary adapter for accommodating an alternative tire.

In some implementations, other tires and features may be employed with the cart. For example, as shown in FIG. 13C, an adapter 1314 may facilitate use of larger tires (e.g., a fat tire 1317) and/or a braking system 1320. As shown, the adapter 1314 is secured to the wheel arm 941*a* with two fasteners 1323 and 1326. A braking system 1320 may be mounted to the adapter 1314 (as shown) or, in other implementations, to other structural elements.

Figure 13D:
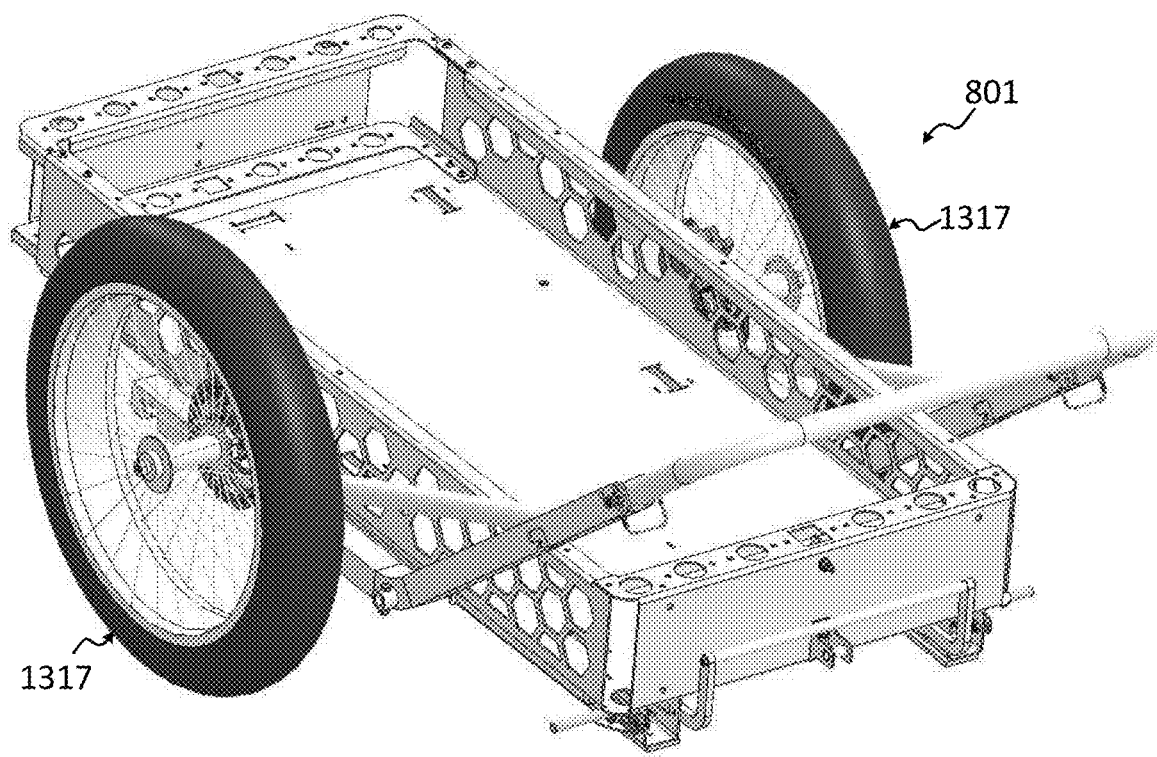
FIG. 13D illustrates a utility cart with alternative tires installed.

FIG. 13D illustrates a utility cart 801 with fat tires 1317 installed. In some implementations (not shown), fat tires 1317 may be coupled to the utility cart 801 with a fork system. In such implementations, a fork system may provide more structural support for the tires 1317, thereby facilitating the transport of higher-weight loads.

Figure 14A:
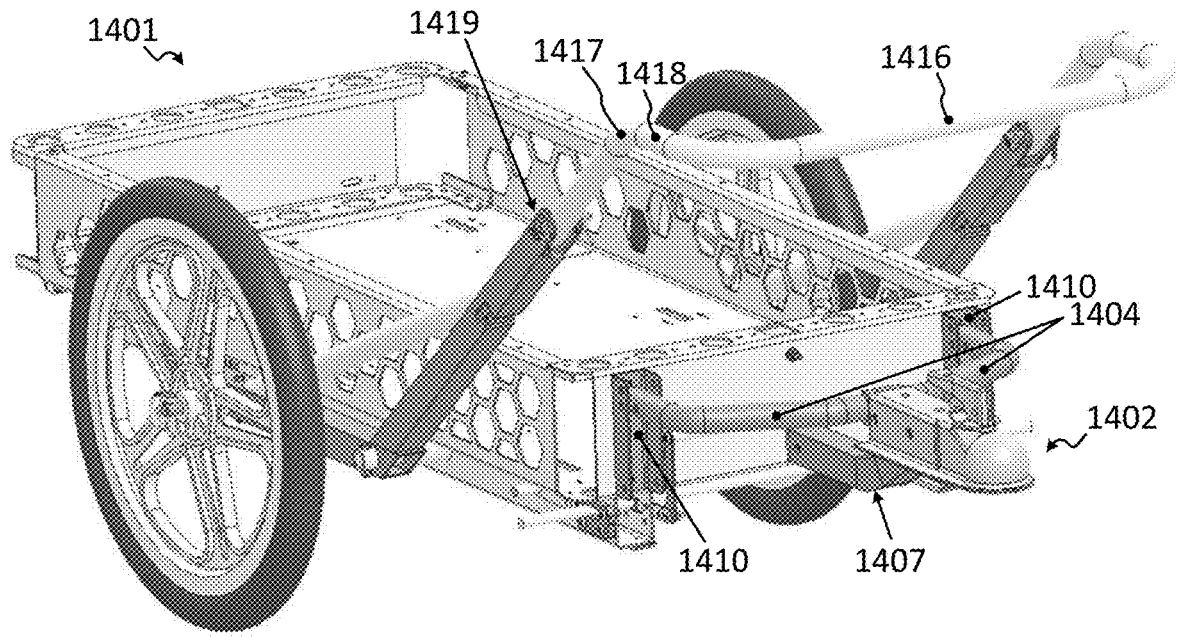
FIGS. 14A-14B illustrate an exemplary utility cart with a hitch coupler.
Figure 14B:
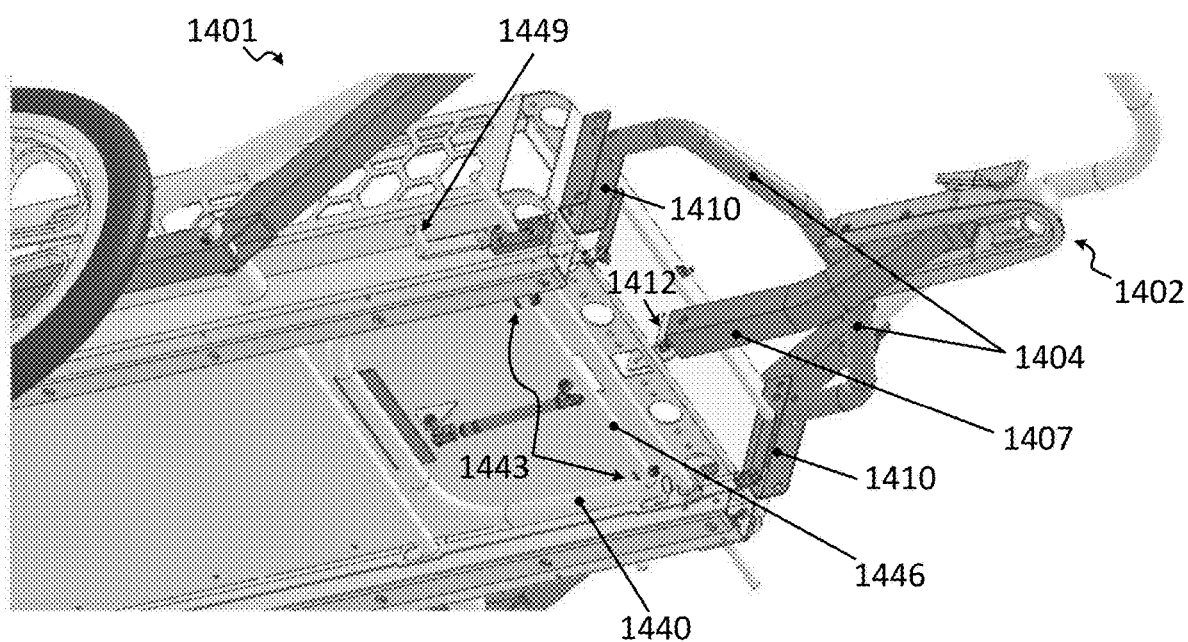

FIGS. 14A and 14B illustrate an exemplary utility cart 1401 with a hitch coupler 1402. As shown, the hitch coupler 1402 is supported by a coupler crossbar 1404 and a coupler support 1407. The coupler crossbar 1404 may be releasably and pivotally secured to support channels 1410 (fasteners not shown but may include cotter pins, bolts, etc.). In some implementations, as shown, the coupler support 1407 may couple to a bracket 1412 (again, with a fastener (not shown)), such as a cotter pin, bolt or other removable connector). The bracket 1412 may take the form of the hitch coupler 1002 shown in FIG. 10; or the bracket may take another form.

A handle 1416 may include various individual and replaceable or customizable components, such as bend segment 1417 or extension segment 1418. Angles and dimensions of these respective segments 1417 and 1418 may vary. For example, the bend segment 1416 may form a smaller or greater angle than shown, varying the position of the handle 1416 to a specific user or load configuration. Likewise, in some implementations, the extension segment 1418 may be shorter or longer than shown. By varying the dimensions of these components 1417 and 1418, it may be possible for users of different heights to use the utility cart 1401, or for the utility cart 1401 to be used more easily with the hitch coupler 1402 in a deployed position (e.g., as shown in FIG. 14A). In addition to dimensions and angles of various components being changed, the handle 1416, in some implementations, may be adjustable rotated at its connection point 1419.

Figure 14C:
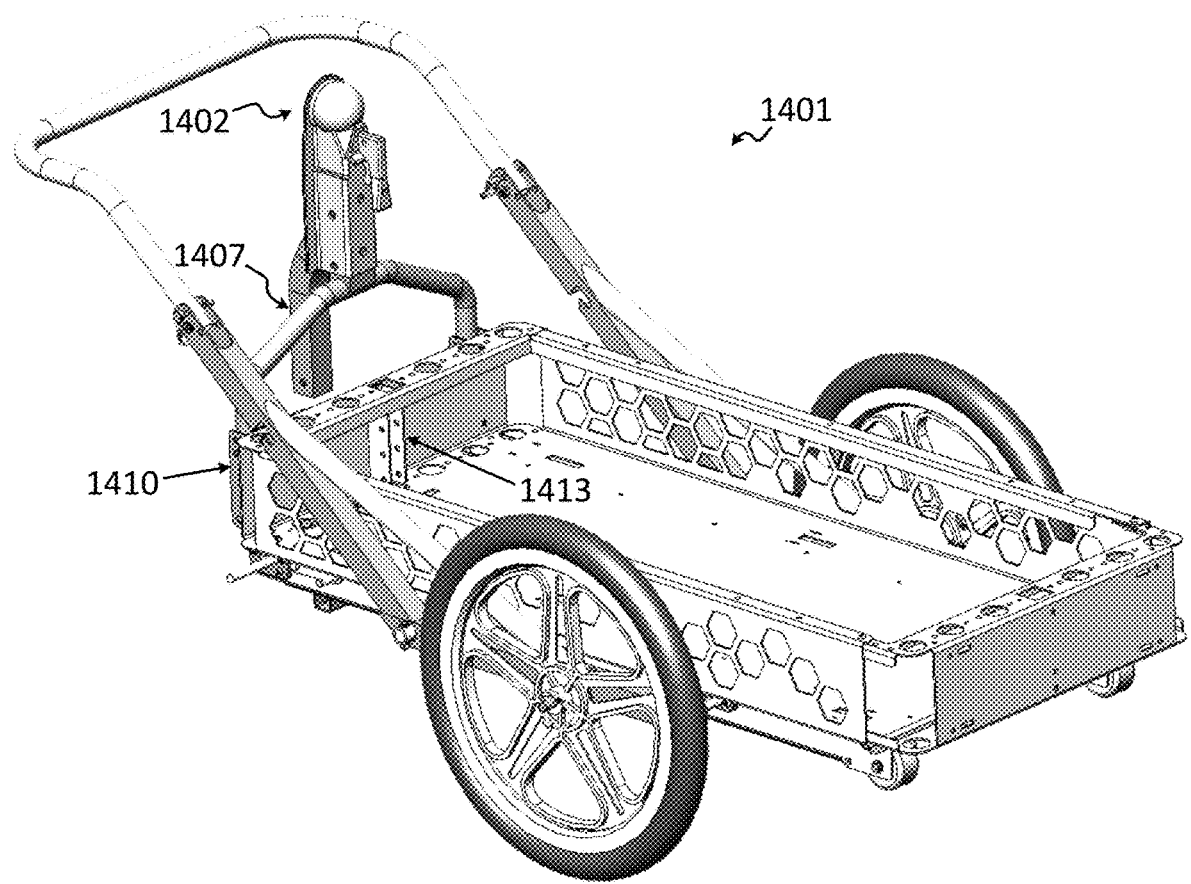
FIGS. 14C-14D illustrate the exemplary utility cart of FIGS. 14A-14B with the hitch coupler rotated for transport.

FIG. 14C illustrates the hitch coupler 1402 in a position in which it has been rotated upward (e.g., for transport). As shown, the coupler support 1407 has been disconnected from the bracket 1412 shown in FIG. 14B. In some implementations, an interior support 1413 may be added to an interior portion of the utility cart (e.g., to strengthen a point of connection with the hitch coupler 1402).

Figure 14D:
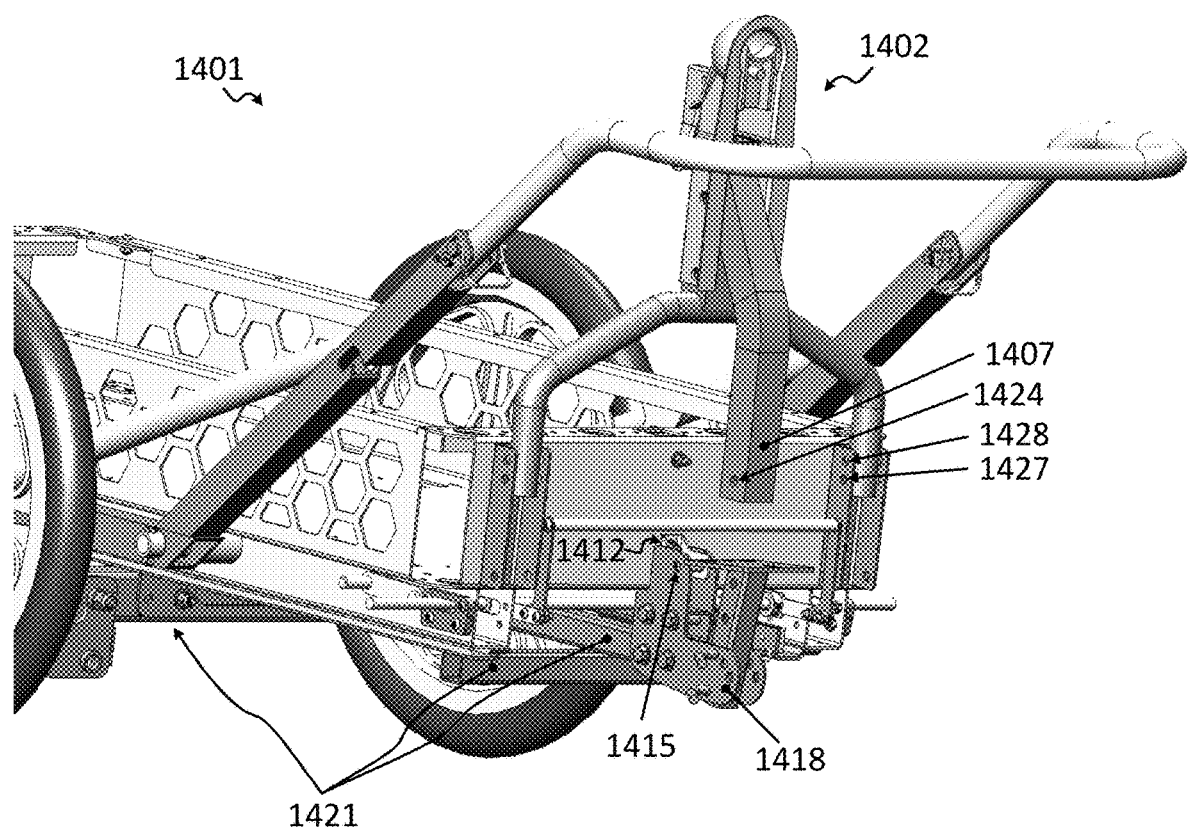

FIG. 14D provides another perspective view of the hitch coupler 1402 in a stowed configuration. As shown in FIG. 14D, an aperture in the bracket 1412 may correspond to an aperture 1415 in a mounting bracket 1418 of a rack 1421 for the utility cart 1401. The apertures may be configured to receive a fastener (not shown) for securely coupling the utility cart 1401 to the rack 1421 during transport of the latter by a vehicle. Another aperture 1424 in the coupler support 1407 may be configured to be coupled to the aperture of the bracket 1412 to secure the coupler support 1407 to the utility cart when the hitch coupler 1402 is rotated down for coupling to a tow vehicle. The hitch coupler 1402 may pivot about a pivot point 1427, and an aperture 1428 may be configured to receive a pin to secure the hitch coupler 1402 in an upright or stowed position.

In some implementations, a hitch coupler 1402 may be employed to facilitate towing of the utility cart 1401 by an all-terrain vehicle, a side-by-side, a tractor, a lawn tractor or other small utility vehicle. In such implementations, a heavier cargo may be transported in the utility cart 1401 than may otherwise be possible in a human-propelled configuration.

Returning to FIG. 14B, another implementation of a kickstand 1440 is illustrated. In particular, a unitary (e.g., a tube or bar member that moves as a unit) kickstand 1440 is shown that pivots about pivot points 1443 on either side of the utility cart. As shown, the kickstand 1440 may be structurally supported by a crossbar 1446 that rotates about a pivot axis of the kickstand 1440. In some implementations, a lever 1449 is coupled to the cross bar 1446 and may be actuated by a user of the utility cart 1401. For example, the lever 1449 may be foot-actuated, such that actuation (e.g., rotation) of the lever 1449 causes the crossbar 1446 to rotate, thereby causing the kickstand 1440 to be deployed.

Figure 15A:
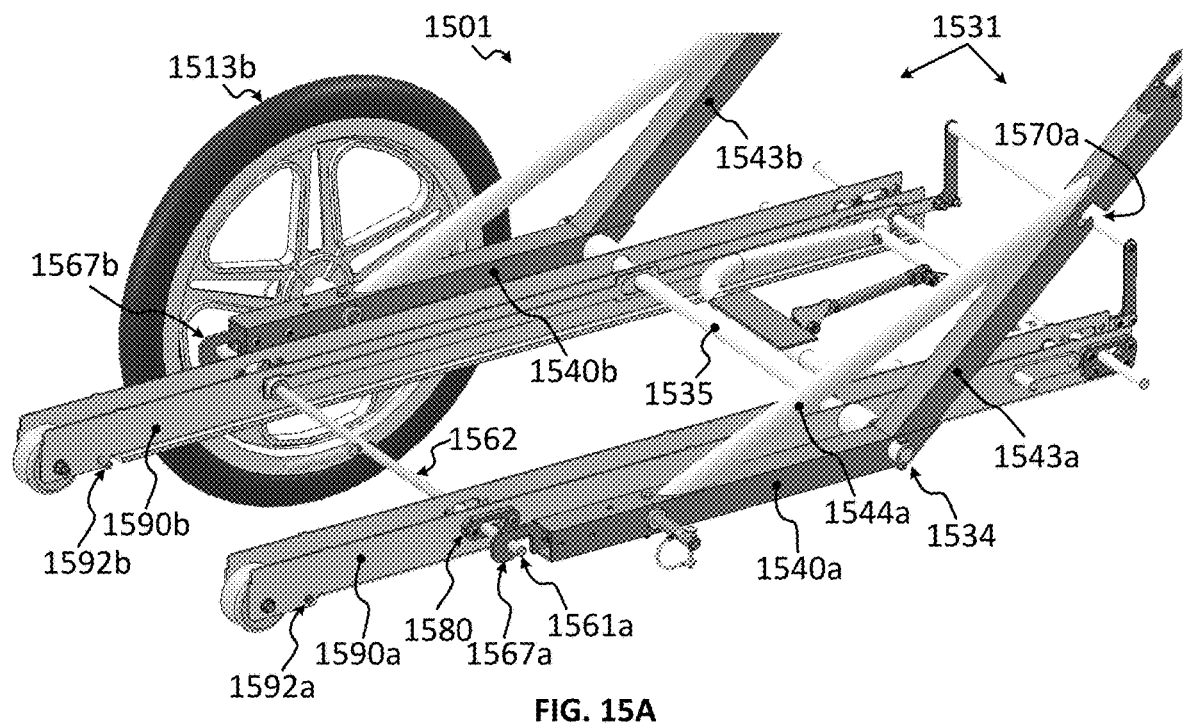
FIGS. 15A-C are perspective views illustrating details of another exemplary utility cart.

FIG. 15A illustrates a partial perspective view of certain components of another exemplary utility cart 1501 having an assembly 1531 with handle arms 1543a and 1543b and wheel arms 1540a and 1540b that are coupled to and rotatable about a pivot point 1534. As shown, the handle arm 1543a and wheel arm 1540a may comprise separate members that are welded or bolted (e.g., with a bracket (not shown)) together and stabilized with a cross piece 1544a.

As shown, a first locking pin 1561a may be formed by the end of a rod 1562 that extends to engage both wheel arms 1540a and 1540b—specifically via first catches 1567a and 1567b. The first catches 1567a and 1567b may be distinct components, separate from the corresponding wheel arms 1540a and 1540b—in some implementations, facilitating easier assembly or enabling use of different materials (e.g., aluminum for the wheel arms 1540a and 1540b and steel for the first catches 1567a and 1567b).

A bushing 1580 may be provided to reduce friction between the rod 1562 and structural members 1590a and 1590b, as the rod 1562 is moved between a locked configuration, in which the end of the rod 1562 that serves as the first locking pin 1561a engages with the first catch 1567a (as shown in FIG. 15A), and an unlocked configuration, in which the first locking pin 1561a disengages with the first catch 1567a—to enable the assembly 1531 to be rotated about the pivot point 1534 (e.g., clockwise, as shown), such that the wheels (wheel 1513b shown) can be lifted up.

Figure 15B:
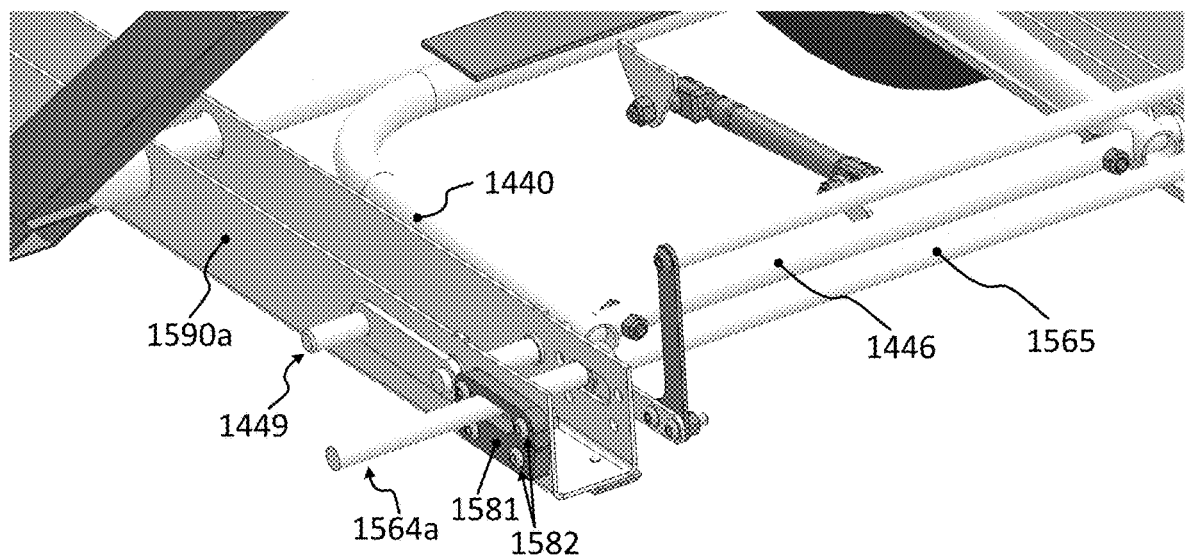

FIG. 15B illustrates additional detail of an exemplary second locking pin 1564a for engaging a second catch 1570a (see FIG. 15A). As shown, the second locking pin 1564a may be formed by the end of a rod 1565 that also forms on its other end (not shown) another second locking pin for engaging the handle arm 1543b.

A bushing 1581 may be provided to reduce friction between the rod 1565 and the structural support 1590a. In some implementations, the bushing 1581 may also function as stop for the lever 1449 that rotates the crossbar 1446 to deploy the kickstand 1440 (see FIG. 14B). The bushing may be coupled to the structural member 1590a with fasteners 1582. In some implementations, the fasteners 1582 are bolts or pins with corresponding nuts or caps 1584 (see FIG. 15C) that may be tack-welded to the structural member 1590a.

Figure 15C:
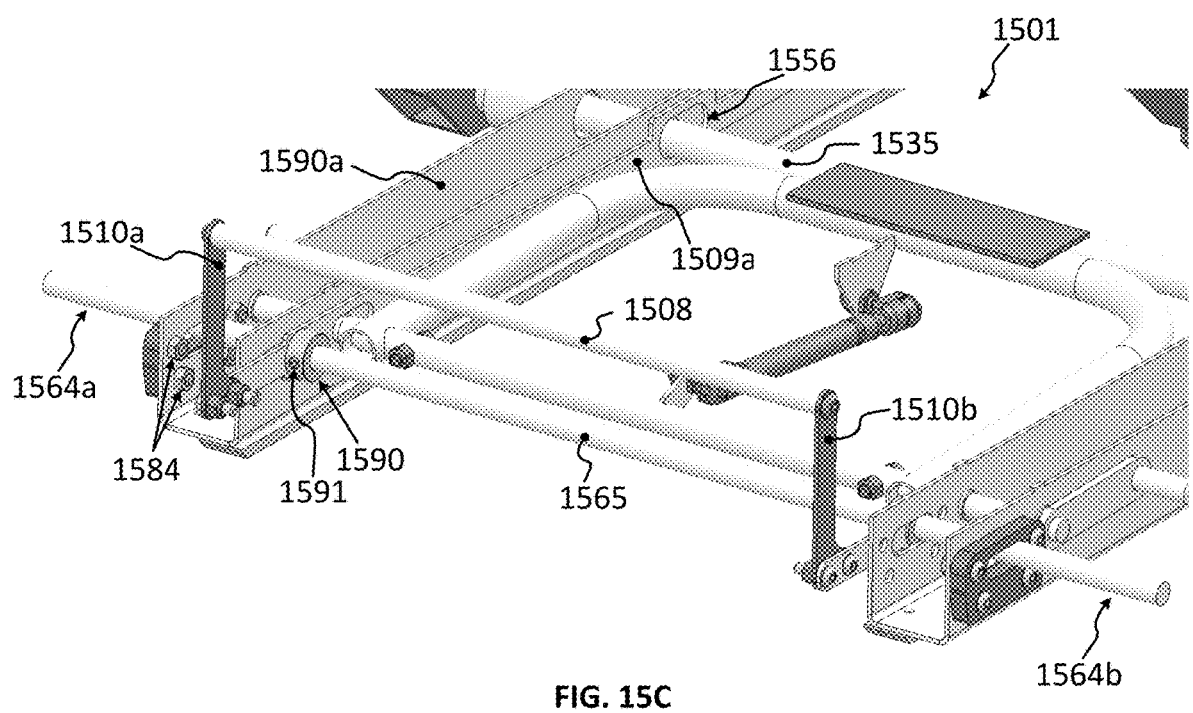

FIG. 15C is another perspective view showing additional detail of an exemplary utility cart 1501. As shown, and in contrast to the implementation shown in FIGS. 9A-9D, side bar 1509a may be coupled to a separate handle support 1510a, rather than directly coupling to the handle 1508.

The rod 1565 that forms the second locking pins 1564a and 1564b may be secured to side bars (side bar 1509a is visible) with a collar 1590 or another connector. The collar 1590 may include a set screw 1591 for securing it to the rod 1565, and the collar 1590 itself may be tack-welded or otherwise secured to the side bar 1590a. A slot 1556 may be provided in the side bar 1509a to enable that side bar 1509a to be translated relative to a pivot rod 1535.

Various implementations have been described, but the reader will appreciate that other variations are possible without departing from the principles described herein. For example, exemplary carts and racks may be made from various materials; they may have various dimensions to facilitate different applications; other accessories than those described may be configured to interface with the cart and/or rack (e.g., bicycle carriers, toolbox carriers, toolboxes, lights, power sources, winches, etc.); structural components may be cast or formed; they may include structural steel, aluminum, stainless steel, titanium, plastic, thermoplastic, various polymers, rubber, etc.; various components may be configured to be inherently resistant to corrosion or rust, or they may be coated or treated to be such; wheels may be hard or soft for various applications, and they may vary in width to facilitate travel over various types of terrain; spring members may take many forms, including that of torsion springs or bars, elastic straps, compression springs, tension springs, etc.; components may be coupled together in various ways, including with nuts and bolts, rivets, pins, other fasteners, adhesives or with various forms of welding; "utility" is used throughout to refer to the functional, utilitarian and/or multipurpose function of exemplary carts but is not intended to be limiting. It is therefore intended that the scope not be limited to specific implementations disclosed herein but rather include all aspects falling within the scope of the appended claims.

What is claimed is:

1. A utility cart comprising:
a cargo hold comprising a cargo bed;
an assembly comprising a wheel arm having a first catch, a handle arm having a second catch, and a wheel; the wheel arm and handle arm fixedly coupled together at an angle and adjacent a pivot point; the wheel rotatably coupled to a distal end of the wheel arm; and
a locking mechanism and a spring member that biases the locking mechanism in a direction that is parallel to a length of the cargo hold, the locking mechanism comprising a first locking pin and a second locking pin that are coupled to a structural member in a manner that fixes a position of the first locking pin relative to a position of the second locking pin;
wherein the assembly is pivotably coupled to the cargo hold, and wherein the locking mechanism and assembly are configured such that in a first orientation, the wheel arm is disposed parallel to a length of the cargo bed, the wheel is disposed below the cargo bed to facilitate travel of the utility cart, and the first locking pin engages the first catch; and such that in a second orientation, the handle arm is disposed parallel to the length of the cargo bed, the wheel is disposed to facilitate stowage of the utility cart, and the second locking pin engages the second catch.

2. The utility cart of claim 1, wherein the locking mechanism comprises a locking plate that is slidably coupled to the cargo hold.

3. The utility cart of claim 1, wherein the cargo hold further comprises a plurality of bearing wheels disposed below a bottom surface and positioned to facilitate rolling of the utility cart in the second orientation.

4. The utility cart of claim 3, wherein the plurality of bearing wheels are aligned to engage one or more tracks on a corresponding vehicle hitch-mounted rack.

5. A utility cart comprising:

a cargo hold comprising a cargo bed;

an assembly comprising a wheel arm having a first catch, a handle arm having a second catch, and a wheel; the wheel arm and handle arm coupled together at an angle and adjacent a pivot point; the wheel rotatably coupled to a distal end of the wheel arm;

a locking mechanism and a spring member, the locking mechanism comprising a first locking pin and a second locking pin that are coupled to a structural member in a manner that fixes a position of the first locking pin relative to a position of the second locking pin; and a plurality of bearing wheels disposed below a bottom surface of the cargo bed;

wherein the assembly is pivotably coupled to the cargo hold, and wherein the locking mechanism and assembly are configured such that in a first orientation, the wheel arm is disposed parallel to a length of the cargo bed, the wheel is disposed below the cargo bed to facilitate travel of the utility cart, and the first locking pin engages the first catch; and such that in a second orientation, the handle arm is disposed parallel to the length of the cargo bed, the wheel is disposed to facilitate stowage of the utility cart, and the second locking pin engages the second catch; wherein, the plurality of bearing wheels are positioned to facilitate rolling of the utility cart in the second orientation; wherein the spring member biases the locking mechanism such that, absent an opposing force, engagement can be maintained between either the first locking pin and the first catch, or between the second locking pin and the second catch.

6. The utility cart of claim 5, wherein the cargo hold comprises a removable rear wall.

7. The utility cart of claim 5, wherein the assembly comprises a telescoping portion that can be rotated about a pivot point to facilitate transport by users of various heights.

8. The utility cart of claim 5, wherein the cargo hold comprises a plurality of stake pockets configured to retain objects or accessories vertically.

9. The utility cart of claim 8, wherein one of the stake pockets is reinforced to a greater extent than the others and is configured to accept a tow accessory to couple the utility cart to a bicycle.

10. The utility cart of claim 5, further comprising one or more kickstands.

11. A system comprising:

a utility cart having (i) a cargo hold comprising a cargo bed; (ii) an assembly comprising a pair of wheel arms each having a first catch, a pair of handle arms each having a second catch, and wheels disposed on each wheel arm; each wheel arm and handle arm coupled together at an angle and adjacent a pivot point; each wheel rotatably coupled to a distal end of its respective wheel arm; (iii) a locking mechanism and a spring member, the locking mechanism comprising a pair of first locking pins and a pair of second locking pins; and (iv) a plurality of bearing wheels disposed below a bottom surface of the cargo bed; and a rack configured to be coupled to a vehicle hitch, the rack comprising (A) tracks that are configured to accommodate pairs of wheels in the plurality of bearing wheels; and (B) a rack pivot that enables the tracks to be rotated towards the ground when the rack is coupled to a vehicle;

wherein the assembly is pivotably coupled to the cargo hold, and wherein the locking mechanism and assembly are configured such that in a first orientation, the wheel arms are disposed parallel to a length of the cargo bed, the wheels are disposed below the cargo bed to facilitate travel of the utility cart, and the first locking pins engage the first catches; and such that in a second orientation, the handle arms are disposed parallel to the length of the cargo bed, the wheels are disposed above a bottom of the cargo bed to facilitate stowage of the utility cart, and the second locking pins engage the second catches; wherein the spring member biases the locking mechanism such that, absent an opposing force, engagement can be maintained between either the first locking pin and the first catch, or between the second locking pin and the second catch.

12. The system of claim 11, wherein the rack further comprises a hitch-coupling member having one of a straight configuration, an "L'" configuration, or an adjustable-height configuration.

13. The system of claim 11, further comprising an adjustable track-pivot stop that adjustably limits rotation of the tracks.

14. The system of claim 13, wherein the adjustable track-pivot stop comprises a plurality of threaded apertures and a corresponding threaded knob.

15. The system of claim 13, wherein the adjustable track-pivot stop further comprises a brake or dampening mechanism that limits a speed at which the tracks can rotate.

16. The system of claim 11, further comprising apertures on a structural member coupled to the tracks and apertures on the rack that cooperate to receive a locking pin to prevent the tracks from rotating.

17. The system of claim 11, further comprising apertures on the rack and apertures on the utility cart that cooperate to receive a locking pin that couples the utility cart to the rack.

18. The system of claim 11, wherein the rack further comprises a mounting plate and a winch mounted on the mounting plate.

19. The system of claim 11, wherein the bearing wheels comprise a plurality of pairs of bearing wheels, wherein at least one pair of the plurality is disposed in a channel, in one of a plurality of mounting positions along a length of the cargo hold.

20. The system of claim 19, wherein the bearing wheels extend below a bottom of the cargo bed and below the channel, such that they are aligned to engage the tracks when the cart is disposed on or being loaded onto the rack.

* * * * *